United States Patent

Suzuki

Patent Number: 6,137,246
Date of Patent: Oct. 24, 2000

[54] CHARGE-EXCHANGE DEVICE

[75] Inventor: Yasuo Suzuki, Ibaraki-ken, Japan

[73] Assignee: Japan Atomic Energy Research, Tokyo, Japan

[21] Appl. No.: 09/162,066

[22] Filed: Sep. 29, 1998

[30] Foreign Application Priority Data

Nov. 21, 1997 [JP] Japan ..................... 9-321228

[51] Int. Cl.$^7$ ............... G21G 4/02; G21B 1/02; H05H 3/02
[52] U.S. Cl. .............. 315/507; 313/359.1; 250/251; 250/290; 250/396 R
[58] Field of Search ................ 250/251, 290, 250/396 R; 313/359.1; 315/507

[56] References Cited

U.S. PATENT DOCUMENTS 3,713,967   1/1973   Hamilton et al. ........................ 176/5

*Primary Examiner*—Bruce C. Anderson
*Assistant Examiner*—Nikita Wells
*Attorney, Agent, or Firm*—Banner & Witcoff, Ltd.

[57] ABSTRACT

A charge-exchange device is disclosed which is able to considerably reduce, without the use of foils, radio activation caused by a beam deflection angle and, which also implements a further efficiency and reduction of a laser output. The charge-exchange device is provided with an undulator and an optical resonator. The undulator magnetic field which has been generated by the undulator generates the Lorentz electric field by interaction with the relativistic velocity of $H^0$ neutral beam being injected. The optical resonator amplifies the photon density of the laser beam and causes it to collide against the injected $H^0$ neutral beam, thereby resonantly exciting the $H^0$ beam to the principal quantum number of 4. The $H^0$ beam which has been resonantly excited or excited by the relativistic Doppler effect in the undulator magnetic field is ionized to $H^+$ ion by the Lorentz electric field.

2 Claims, 21 Drawing Sheets

NEUTRALIZING RANGE OF H ION WITH 1.5 GeV IN MAGNETIC FIELD

LIGHT EXCITATION METHOD (ONE PATH)

OPTICAL CIRCUIT (MULTI PATHS) X-TYPE

OPTICAL CIRCUIT (MULTI PATHS) SQUARE TYPE

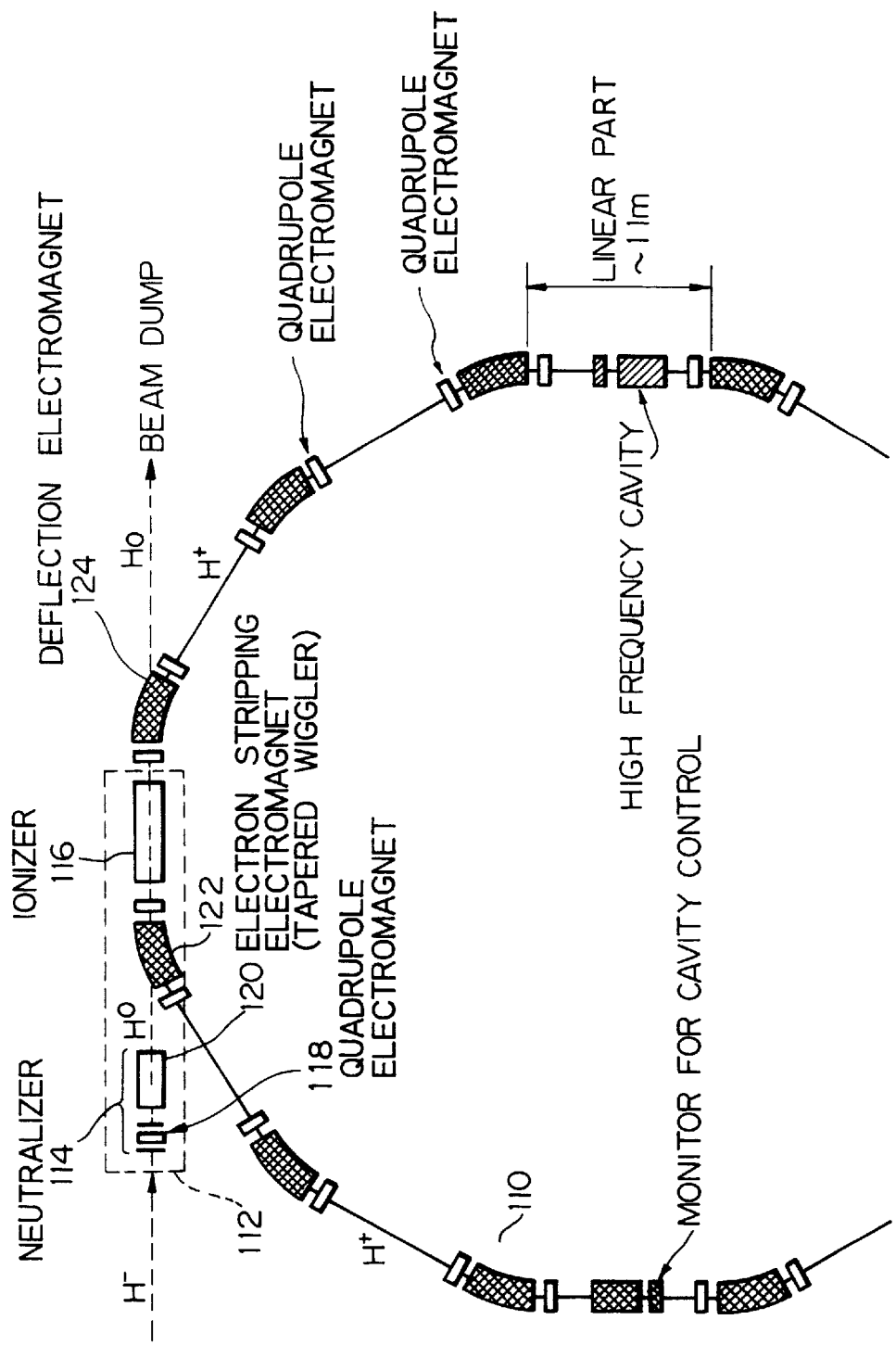

CROSSING OF LIGHT AND ITS CROSS SECTION

DISTRIBUTION OF MAGNETIC FIELD

BEAM DEFLECTION ANGLE AT CHARGE-EXCHANGE POSITION Z

DEVIATION x AT CHARGE-EXCHANGE POSITION Z

INCIDENT BEAM AND CHARGE-EXCHANGE BEAM

BEAM CHARGE-EXCHANGE AND BEAM SPILL

DISTRIBUTION OF MAGNETIC FIELD

IONIZATION POSITION AND DEFLECTION ANGLE

PHOTON DENSITY $n_\nu$ AND IONIZED BEAM $Z_c$

3 LEVELS OF ENERGY ($L_1$=15cm, $L_2$=10cm, LENGTH OF PERIOD 50cm, NUMBER OF PERIODS 14, TOTAL LENGTH 7m)

HALF CYCLE OF UNDULATOR AND TWO REGEONS

SOLUTION OF RATE EQUATION

CHARGE-EXCHANGE DEVICE

BACKGROUND OF THE INVENTION

1) Field of the Invention

The present invention relates to a charge-exchange device.

Development of powerful next-generation neutron sources is receiving general attention as a target for the development of advanced new scientific technology in the 21st century. One such project is the realization of a large-scale proton accelerator in the order of 5 MW by NSNS in U.S.A and by ESS in Europe. A proposal is also being made following the neutron study plan of the Japan Atomic Energy Research Institute to establish a multi-purpose research facility for utilizing proton beams in the order of 1.5 GeV, 8 MW with an ultra powerful super conducting linear proton accelerator as the principal facility. A storage ring for generating a very intense pulsed neutron (equivalent to 5 MW) is required for the study of neutron scattering which is one of the principal study themes. Since these accelerators and storage rings generate neutron beams having a large output which has not been experienced in the past, counter measures against leakage of beams from not only the accelerators themselves but also peripheral facilities, as well as a reduction in radio activation are deemed to be of critical importance in attaining stable and safe operation of accelerators and storage rings. Therefore, success of the countermeasures against reduction of radio activation is understood to be a decisive factor for the good result of the development and easiness of maintenance and operation.

The injection and ejection device for the storage ring is adapted to receive an H⁻ beam of 1.5 GeV ($\beta$=0.92) having a peak of 30 mA for a period of 3.6 ms from the super-conducting linear accelerator and to store the same in the ring as an H⁺ beam at one time, and after having compressed it to a beam in the order of 0.5 $\mu$s, and to deliver the beam to the target which will be the neutron source in the form of a pulse of 50 Hz having a peak of 100 A.

The present invention relates to a charge-exchange device particularly suitable for use with an injection device for a storage ring for generating a very intense pulsed neutron beam as described above.

2) Prior Art

It is conventional practice to use an electromagnet for changing the trajectory of a proton beam and the like and a foil for exchanging a charge for injection into such a ring (see for example A. H Mohagheghi et al. "Interaction of relativistic H⁻ ions with thin foils" PHYSICAL REVIEW A, Volume 43, Number 3, Feb. 1, 1991 (published by The American Society)). However, in order to take advantage of a super-conducting linear accelerator as included in the above-mentioned plan, it is expedient that by expanding the pulse width the output is made larger as compared to a normal conducting accelerator while the beam current is kept low, so that any adverse affect of the space charge over the beam is minimized. Accordingly, it becomes necessary for a multi-turn injection of some thousands pulses to be conducted for a period in the order of 3.6 ms so as to store a sufficient beam in the ring.

In this instance, it should be noted that since the foil will be exposed to radiation by the particles themselves which have been injected for a long period of time and the proton beam which has previously been injected and is circulating around the ring will collide against the foil again resulting in damage to the foil, it is difficult to keep the foil in a sound condition. Besides, it is also pointed out that the peripheral devices will be subjected to radio activation due to the variation of the trajectory and scattering of the proton beam. In other words, the beam injection device which includes a charge-exchange device as one of the components is a device in which it is most difficult to take countermeasures against radio activation among such components as constitute the ring. Therefore, it is urgently required to develop a novel apparatus to overcome these problems.

In view of this situation, the inventor of the present application has conducted studies as reported in the research report of the Japan Atomic Energy Research Institute as titled JAERI-Research 97-040 (June, 1997), a novel method of injection and ejection wherein an H⁻ beam which has been accelerated by a super-conducting linear accelerator is charge-exchanged and injected into and ejected from the storage ring as proton beams. In addition, the inventor has studied many other methods using electrons, ionsand photons. It has been demonstrated that among many methods that have been studied, the method of colliding the beam against the plasma ion in the Lorentz field created by interaction of the strong wiggler magnetic field and high energy particles and the method of light excitation by Doppler-shifted photon beam are regarded as the most promising methods.

The inventor of the present application proposed another method of injecting the beam into the storage ring in the research report of the Japan Atomic Energy Research Institute titled JAERI-Research 96-041 (June, 1997). The injection device according to this method is constructed by a neutralizer and an ionizer. The neutralizer is located at the beam transport port section outside of the ring and consists of an electromagnet for convergence and a wiggler and is adapted to neutralize H⁻ to H⁰. The ionizer is located at the linear section of the ring and consists of a wiggler and an optical resonator. The ionizer is adapted to utilize the Lorentz force owing to the wiggler magnetic field and the relativistic velocity of the injected particles to ionize the H⁰ beam by scattering it to the photon beam. According to this method of injection, the trajectory of the beam in the ring will not be varied by a bump electromagnet in the prior art apparatus, or beam scattering by the foil will not be caused. However, it has to be pointed out that although the countermeasure against low radio activation in the beam loss at the injection part of the proton storage ring is the greatest technical problem, such technical problems are not being considered currently.

The inventor of the present application also proposed in the research report of the Japan Atomic Energy Research Institute titled JAERI-Research 97-057 (August, 1997) another method of injecting the beam into the storage ring. According to this method, utilization of Lorentz electric field of the injected particles having a relativistic velocity by the neutralizer and the ionizer is the same as that of said another injection method, as described in the above-mentioned research report titled JAERI-Research 97-041, while the manner of ionization is different and the charge is exchanged efficiently by making use of a Doppler effect and the resonance absorption of laser beam. To reduce radio activation, or in order to reduce radio activation caused by beam spill, the beam deflection angle by the wiggler magnetic field is made smaller so that the range in which the magnetic field is present is shortened. However, as a consequence, the output of the laser must be increased to the extent that it becomes impractical.

SUMMARY OF THE INVENTION

An object of the present invention is to attain further efficiency and reduction of the output of a laser in such a charge exchange device which does not use any foils and to reduce considerably the radio activation caused by the beam deflection angle.

In order to attain the object as mentioned above, a charge exchange device according to the present invention is characterized by comprising a magnetic field generation means for generating an undulator magnetic field in the direction of $H^0$ neutral beam being injected, said undulator magnetic field generating the Lorentz electric field by interaction with the relativistic velocity of said injected $H^0$ neutral beam; and an optical resonator for amplifying the photon density of a laser beam to the extent of the photon density wherein the laser beam collides against said injected $H^0$ neutral beam at the relativistic velocity to resonantly excite said $H^0$ to a desired principal quantum number; and in that said magnetic field generation means and said optical resonator cooperate with each other to cause the laser beam of which photon density has been amplified to collide against the injected $H^0$ beam so as to resonantly excite said $H^0$ to a desired principal quantum number and excite the same by the relativistic Doppler effect to ionize the same to $H^+$ ion by said generated Lorentz electric field.

In the charge-exchange device according to the present invention, the magnetic field generating means generates an undulator magnetic field, and the magnetic field generating means and the optical resonator cooperate with each other to cause the laser beam, the photon density of which has been amplified to collide against the injected $H^0$ beam, to resonantly excite said $H^0$ to a desired principal quantum number and excite the same by the relativistic Doppler effect to ionize the same to $H^+$ ion by said generated Lorentz electric field. Therefore, radio activation may be reduced by a constitution without the use of a foil, and the beam spill caused by the beam deflection angle may be eliminated. Accordingly, a further reduction of activation may be made possible and a further reduction of the output of the laser beam that has been injected into the charge-exchange device may be made possible rather than the means as disclosed in JAERI-Research 97-040, 97-041 and 97-057. Furthermore, even if this charge-exchange device is applied to the injection device of the proton storage ring, it will not adversely affect the ions in circulation. These and other objects and advantages will become apparent upon reading the following description of the present invention with reference to the accompanying drawings.

BRIEF DESCRIPTION OF THE DRAWINGS

FIG. 6b illustrates an example of the configuration of recirculation for enhancing the efficiency of the interaction between $H^0$ and the laser beam at the time of light excitation shown in FIG. 6a;

FIG. 6c illustrates another example of the configuration of recirculation for enhancing the efficiency of the interaction between $H^0$ and the laser beam at the time of light excitation as shown in FIG. 6a;

FIG. 7 is an arrangement drawing of an injector to which a charge-exchange device according to another embodiment of the prior art is applied;

FIG. 8b illustrates the distribution of magnetic field of the tapered wiggler as shown in FIG. 8a;

FIG. 8c illustrates the neutralized position and the angle of deflection of the tapered wiggler shown in FIG. 8a;

FIG. 9a paradigmatically illustrates an example of a configuration of ionizer which generates wiggler magnetic field according to another configuration of the prior art;

FIG. 9b illustrates the distribution of magnetic field of the ionizer as shown in FIG. 9a;

FIG. 15b illustrates the beam deflection angle at the charge-exchange position corresponding to the distribution of the magnetic field shown in FIG. 15a;

FIG. 15c illustrates the deviation at the charge-exchange position corresponding to the distribution of the magnetic field shown in FIG. 15a;

FIG. 15d illustrates the incident beam and the charge-exchanged beam corresponding to the distribution of the magnetic field shown in FIG. 15a;

FIG. 15e illustrates the beam charge-exchange and the beam spill corresponding to the distribution of the magnetic field shown in FIG. 15a;

FIG. 16b illustrates the distribution of the wiggler magnetic field corresponding to the relative positional relation as shown in FIG. 16a;

FIG. 16c illustrates the ionization position and the deflection angle corresponding to the relative positional relation shown in FIG. 16a;

FIG. 16d illustrates the photon density and the ionized beam corresponding to the relative positional relation shown in FIG. 16a;

FIG. 19b illustrates the ionization points and the deflection angle corresponding to FIG. 19a;

DETAILED DESCRIPTION OF THE PREFERRED EMBODIMENTS

Figure 1:
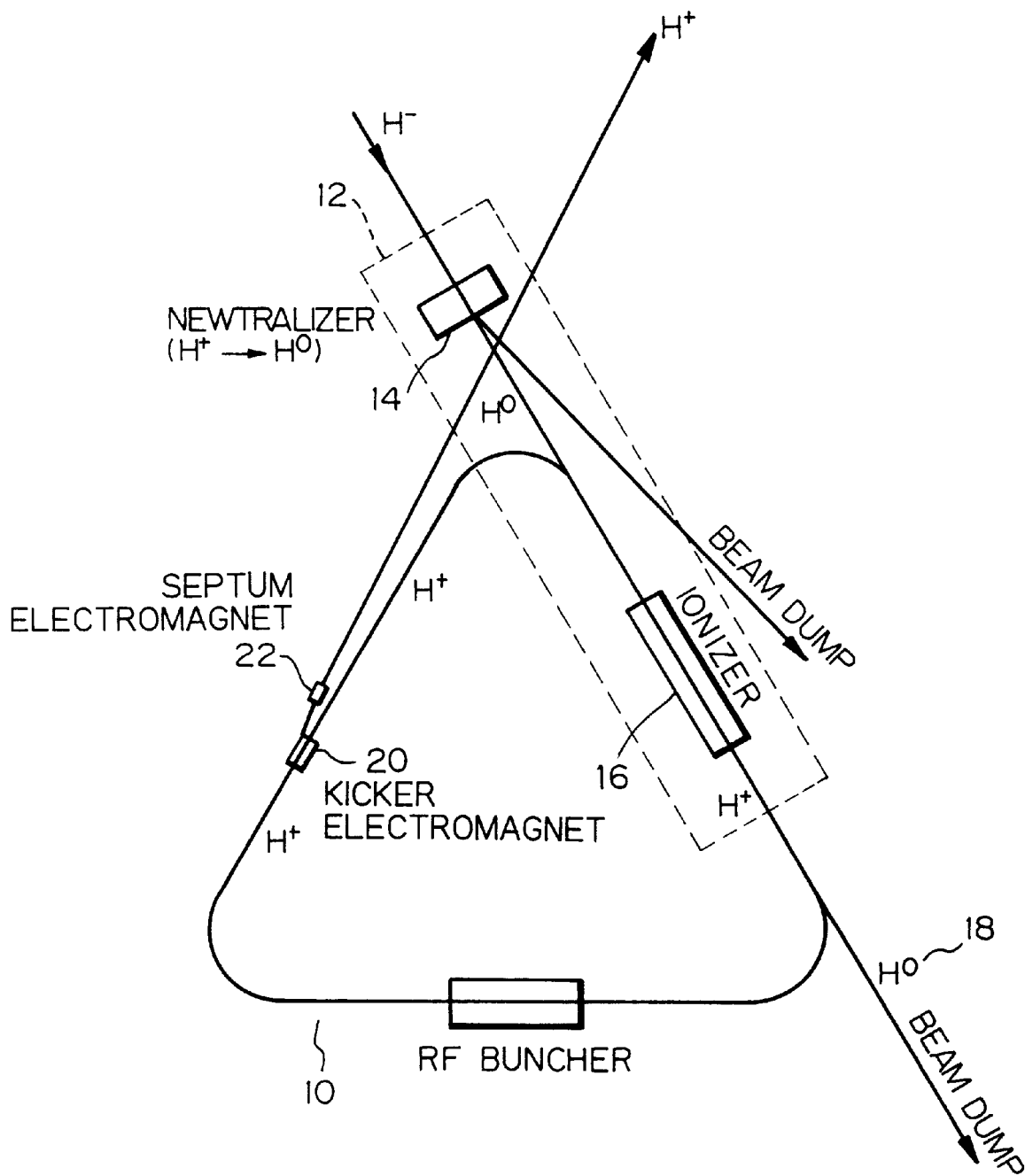
FIG. 1 is a paradigmatic drawing of the concept of an injection and ejection device of the simplest ring to which a charge-exchange device according to an embodiment of the prior art is applied.

A preferred embodiment wherein a charge-exchange device according to the present invention is applied to an injection device for the storage ring for generation of intense pulsed neutron as earlier explained will now be explained in detail by referring to the accompanying drawings. In the drawings, the same reference numerals designate the same or similar elements.

For the sake of understanding the charge-exchange device according to the present invention more easily, the research report of the Japan Atomic Power Research Institute titled JAERI-Research 97-040, 97-041 and 97-057 are incorporated herein by reference.

A. Charge-Exchange Device Described in the Research Report of the Japan Atomic Power Research Institute, JAERI-Research 97-040

In the ring injection and ejection device of the charge-exchange type to which the charge-exchange device described in JAERI-Research 97-040 is applied, a wiggler magnetic field is used for charge-exchange but the trajectory of the ring is not modified for injection and ejection, that is, a bump electromagnet or the like is not used. The concept of the injection and ejection device of the simplest ring type is paradigmatically illustrated in FIG. 1. As paradigmatically illustrated in FIG. 1, a storage (accumulator) ring 10 is provided with a linear part section where an injection device and an ejection device are installed. To exchange the charge, ionization is conducted by the Lorentz force generated at the time of fast particles rushed in the static magnetic field and collision of the particles with photons.

According to JAERI-Research 97-040, the design of every type of devices is intended to achieve the in situ beam loss to the extent in the order of $10^{-5}$.

A injection device 12 shown in FIG. 1 is adapted to take $H^-$ beam coming from a ultra powerful proton beam accelerator into a ring 10 without causing it to be substantially scattered. The injection device 12 includes a neutralizer 14 which is one of the charge-exchange devices adapted to firstly neutralize $H^-$ ion from the ultra powerful proton beam accelerator under the Lorentz force and conduct the neutralized ion into the ring trajectory, and an ionizer 16 which is one of other charge-exchange devices adapted to cause the photon to collide against the $H^0$ beam in the state of applying the Lorentz force to the $H^0$ beam, thereby ionizing the $H^0$ beam and putting it into the ring trajectory. In other words, the injection device 12 requires two processes for injection of the beam, i.e., neutralization of $H^-$, ($H^- \rightarrow H^0$) and ($H^0 \rightarrow H^+$).

Neutralization

Figure 2:
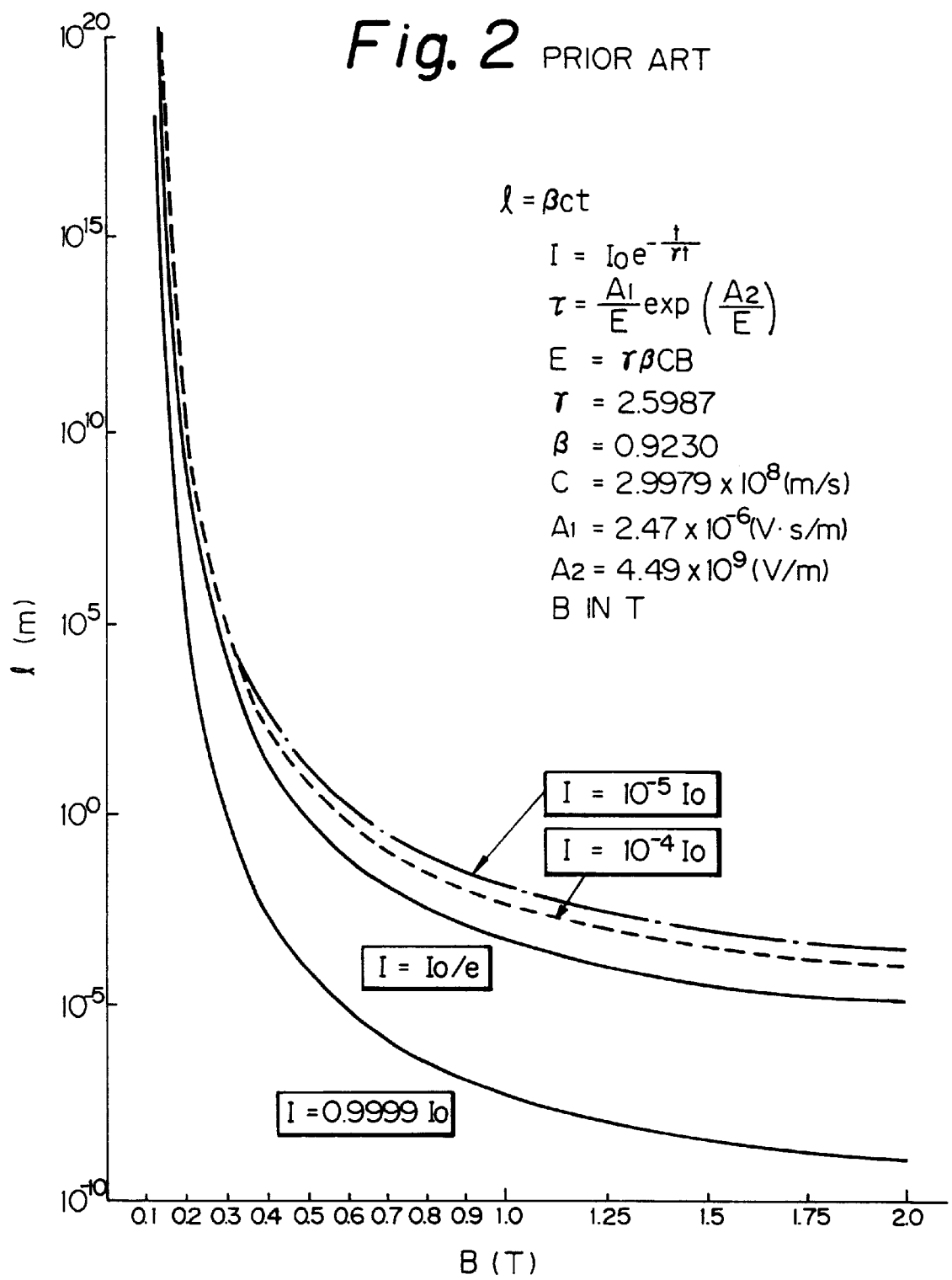
FIG. 2 is a graph illustrating the range of a $H^-$ ion being neutralized by stripping an electron from the $H^-$ ion as the function of the magnetic field required for such neutralization.

Firstly, the method of neutralizing $H^-$ ion by means of the neutralizer 14 shown in FIG. 1 and directing the neutralized $H^-$ ion into the ring 10 is explained. When the $H^-$ ion passing at a velocity near to the light speed, or the relativistic speed is caused to pass through the intense magnetic field orthogonal to the $H^-$ ion, the Lorentz electric field of $E=V \times B$ is generated, and this electric field may disturb the electric field associated with the electron captured by the H⁻ ion to make the electron free, or neutralize the H⁻ ion. In other words, the potential of the electron following the outermost trajectory for forming H⁻ beam is lowered by the Lorentz electric field to separate the electron from the hydrogen atom so that the H⁻ beam is neutralized. FIG. 2 illustrates the neutralizing range of H⁻ ion by stripping the electron from H⁻ ion as the function of the magnetic fields for neutralization. It is to be noted that FIG. 2 has been prepared by modifying the thesis by A. J. Jason et al: IEEE Transactions on Nuclear Science, NS-28, No. 3, June 1981. FIG. 2 shows that if H⁻ beams is passed some ten centimeter through the deflected magnetic field of 0.5 T orthogonal to the H⁻ beams, almost all H⁻ beams will be neutralized by the Lorentz force: $eE=e\beta\gamma cB$, thereby making it possible to reduce the probability of the electron remaining without being stripped to approx. one hundred-thousandth. As is well known in the technical field concerned, $\beta$ and $\gamma$ are respectively, $\beta=v/c$ and $\gamma=1/(1-\beta^2)^{1/2}$.

Figure 3A:
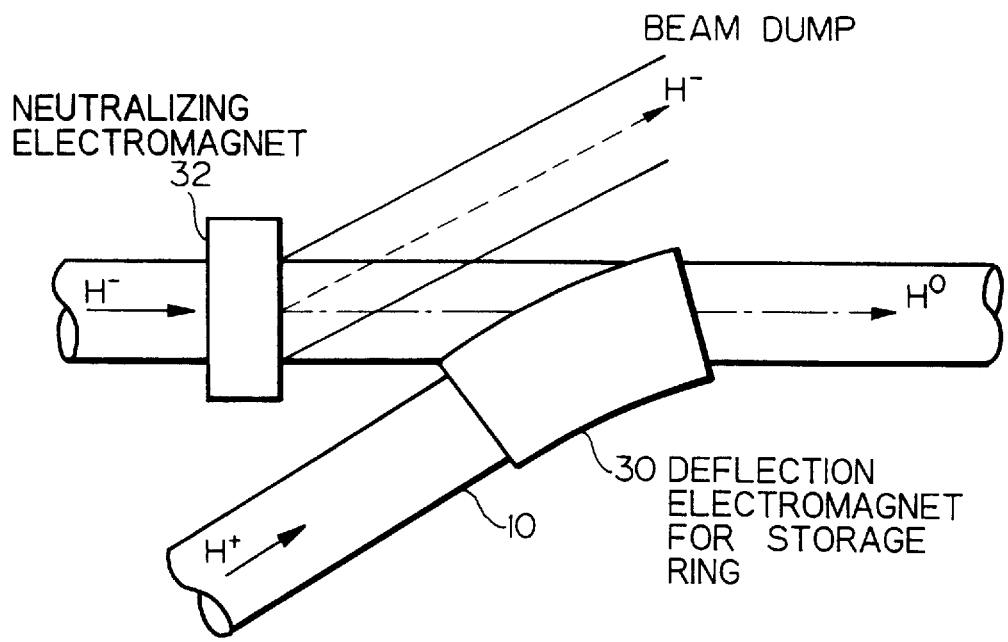
FIG. 3a illustrates an example of arrangement of an electron stripper for neutralization of $H^-$ by the Lorentz force in the injection and ejection device shown in FIG. 1, illustrating a configuration wherein a magnet for neutralization is placed externally.
Figure 3B:
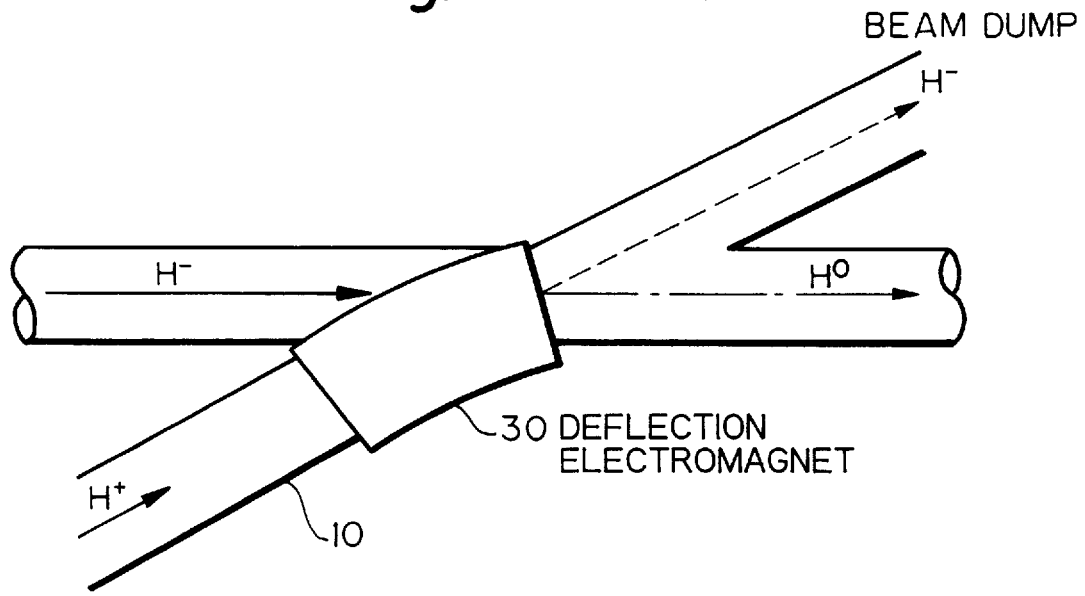
FIG. 3b illustrates an example of another arrangement of an electron stripper for neutralization of $H^-$ by the Lorentz force in the injection and ejection device shown in FIG. 1, illustrating a configuration in which a deflection electromagnet adapted to deflect the $H^+$ beam circulating in the ring also functions as an electron stripper.

Accordingly, it is possible to introduce the neutralized beam into the ring 10 by focusing and causing it to proceed straightforwardly, either by, as shown in FIG. 3b, directly using the deflection magnetic field provided by the deflection electromagnet 30 of the ring 10 as the electron stripper or by, as shown in FIG. 3a, installing a suitable neutralizing electromagnet 32 outside of the ring 10. The direction of the H⁰ beam proceeding straightforwardly is decided depending on the distance of the magnetic field exerting the beam prior to neutralization. However, the width of deflection is sufficiently narrow that H⁰ beam may be regarded as proceeding straightforwardly as before. Should any residual H⁻ ions be left, they may be guided to the beam dump by bending the direction of the same by use of the charges of the residual H⁻ ions.

Ionization

Figure 4:
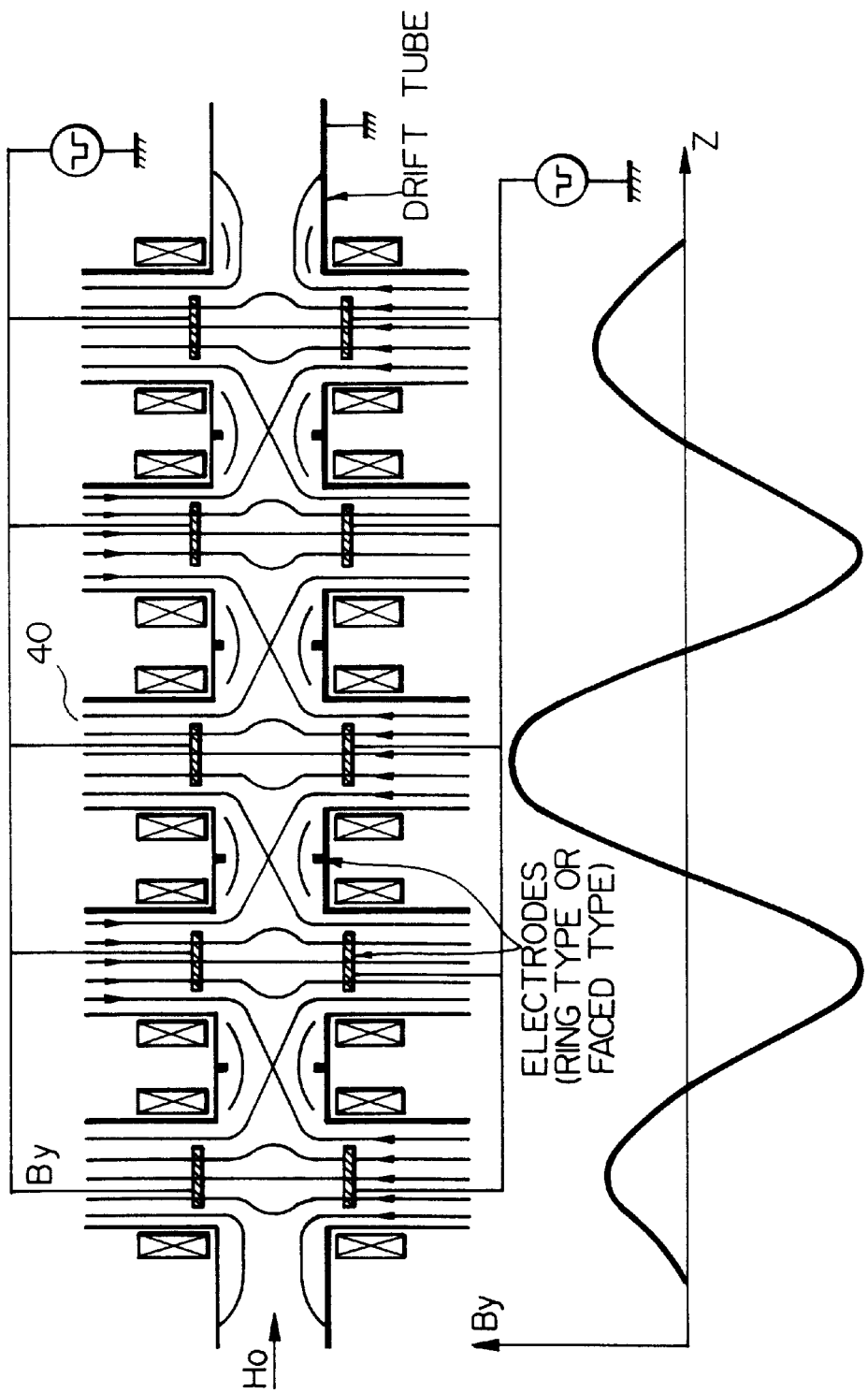
FIG. 4 illustrates an example of a configuration of an ionizer which generates wiggler magnetic field according to one embodiment of the prior art.

H⁻ ion is neutralized by the neutralization device 14 as shown in FIG. 1 and the neutralized beam proceeds straightforwardly under inertia and moves rapidly into the wiggler type magnetic field of the ionizer 16 provided at the linear part of the ring 10. The reason of employing a wiggler type magnetic field is that even if a strong magnetic field is used, the trajectory of the ion which is already circulating will not be influenced and the trajectory of the ion ionized in the ring will also be less influenced. A configuration of the ionizer 16 which provides a wiggler magnetic field is shown in FIG. 4. According to the configuration shown in FIG. 4, the wiggler magnetic field utilizes five pairs of five super-conducting electromagnets 40 (the coil width being 5 cm), having a length of a cycle of 20 cm, and max. magnetic field of 5 T having a substantial cycles of 1.5. The magnetic field intensity at the opposite ends is ½ so as to minimize the influence over the circulating ion. The wiggler of superconducting electromagnet in the order of this capacity is already put into practical use as the wiggler available from KEK Photon Factory.

Figure 5:
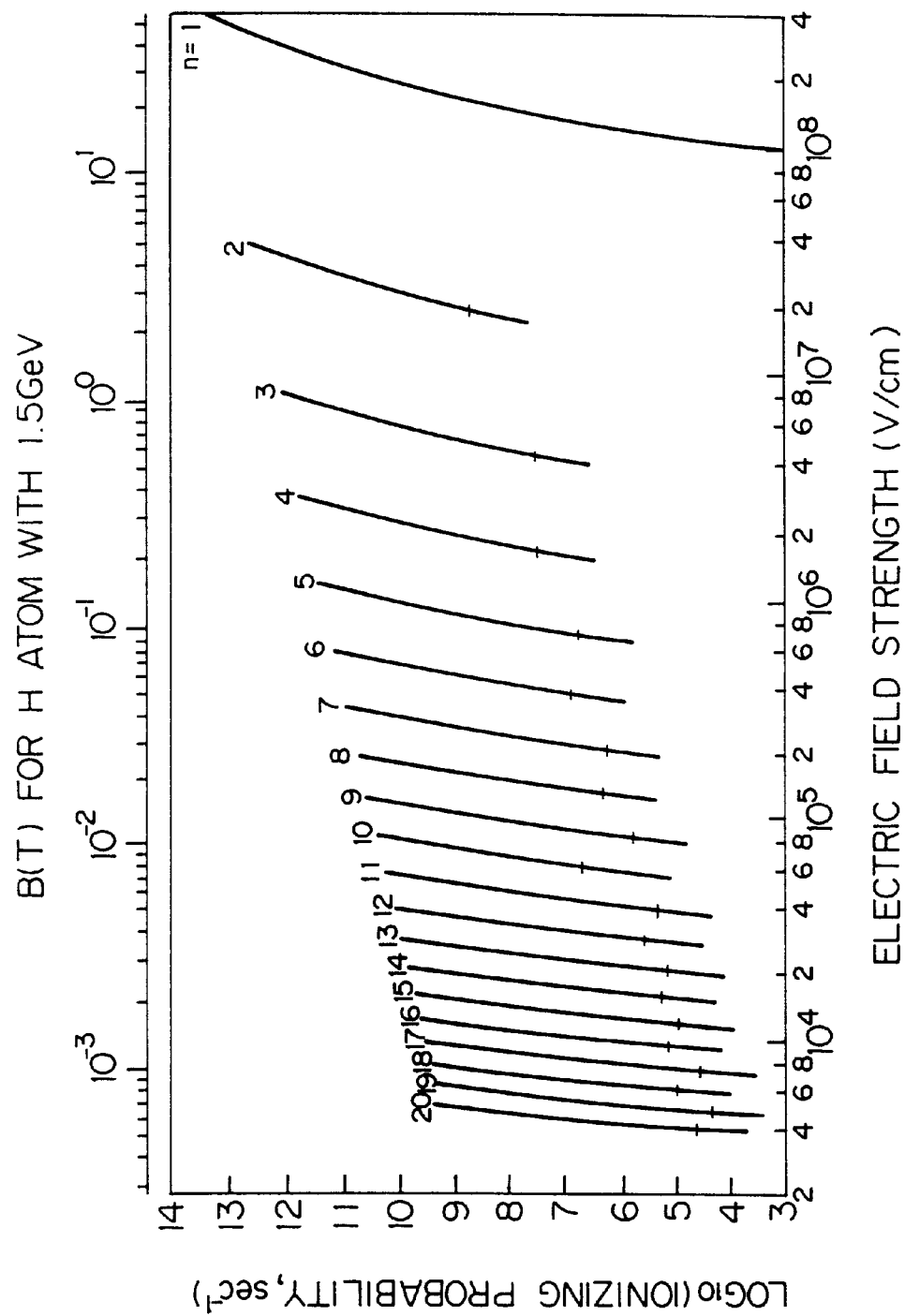
FIG. 5 is a graph illustrating the relationship between the electric field strength and the ionizing probability.

A part of the H⁰ beam which has entered here may be ionized only by the Lorentz force. The probability of such ionization is as shown in FIG. 5, the excited atom having the principal quantum number of more than 1 will be 100% ionized in the time of the atom passing through the magnetic field (t=3×5 cm/v~0.543 ns). (It is to be noted that FIG. 5 is employed from D. S. Bailey et al: Nuclear Fusion 5,41 (1965)). However, it is also to be noted that the distribution of the magnetic field is deemed as the rectangular wave form for simplification. The intensity of the magnetic field is not sufficient to ionize the remaining atom H⁰ in the ground state. Therefore, the atom must be excited by some method to attain n=more than 1.

An electron which is static in the laboratory system may conversely be regarded as the electron beam of $\beta=0.92$ which is moved rapidly into the hydrogen gas as viewed from the system moving with H⁰ of 1.5 GeV ($\beta=0.92$). Namely, this state is equivalent to the electron beam of about 818 keV ($\beta=0.92$) being struck into the static H⁰ gas. With H⁰ colliding against this electron, H⁰ is not only ionized but also ionized by the Lorentz force of the wiggler magnetic field if H⁰ in the ground state is excited to the state of n=more than 1. Considering the system moving with the beam, and assuming that n is the density of H⁰, $n_e$ is the electron density and $\sigma$ will take the numerical value of the system moving with H⁰, then, $$\frac{dn}{dt'}=-n\sigma\beta cn_e.$$

Accordingly, after solving the equation and considering the laboratory system by putting the solution therein, the following equations may be obtained;

$$n=n_0 \exp(-t/\gamma\tau),$$

and $$\tau=1/\sigma\beta cn_e.$$

Here, assuming $n/n_0=10^{-5}$, t=0.543 ns (the sum of each time for passage through each of three portions having the maximum intensity of the magnetic field), and $\gamma=2.60$, then $\tau=18$ ps may be obtained as the necessary condition and $n_e\sigma \sim 2$/cm may be obtained.

If the beam is ionized, it will be H⁺, and the trajectory will be changed by being influenced by the magnetic field of the deflection electromagnet, whereby the beam will come into the ring trajectory. Change of the trajectory of the ion ionized in the wiggler magnetic field which is caused by the wiggler magnetic field after ionization will be later explained.

With regard to the method of excitation of H⁰, many different collision cross-sections may be conceived, and the method of light excitation inter-alia will now be explained.

Figure 6A:
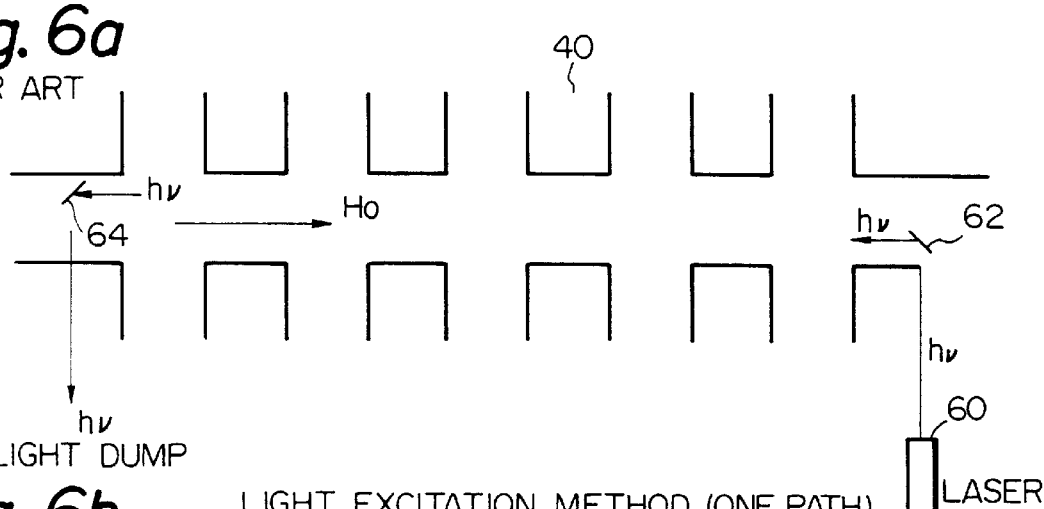
FIG. 6a is a paradigmatic drawing for explaining the light excitation of $H^0$ according to a light excitation ionizing method of the prior art.
Figure 6B:
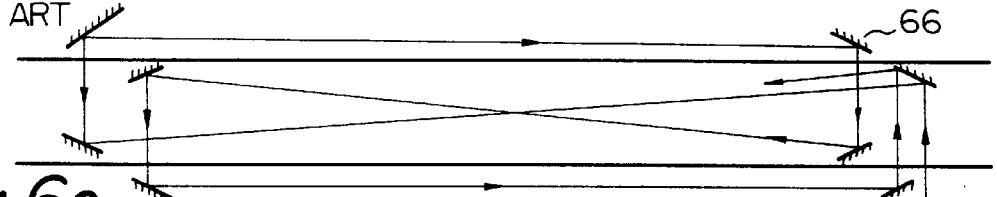
Figure 6C:
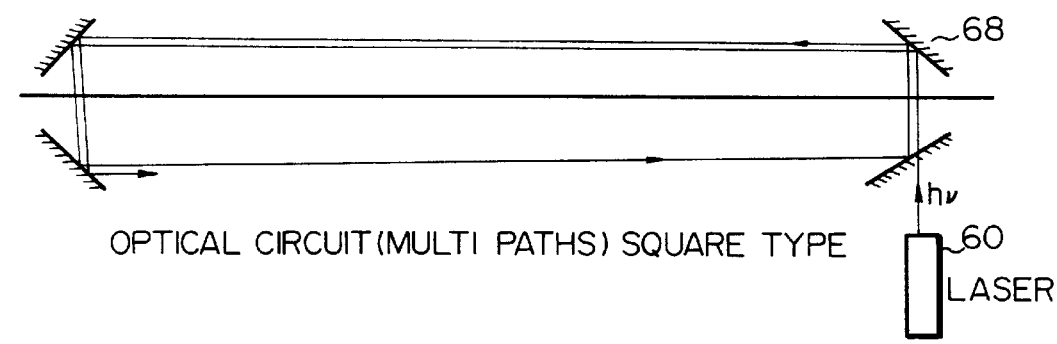

The absorption cross-section of light in which H⁰ in the ground state is excited to the level of 2 p is, as well known, $\sigma\sim 1\times 10^{-13}$ cm² at the light of 121.6 nm (see Discharge Handbook, Electric Engineering Society, 1974, p.19). As shown in FIG. 6a, assume that a laser beam is caused to collide against the front of H⁰ beam. In FIG. 6a, the H⁰ beam runs from the left to the right as viewed in the drawing through pairs of super-conducting electromagnets 40 which generate the wiggler magnetic field of the ionizer 16. It is to be noted that since FIG. 6 is the paradigmatic drawing for explaining the light excitation of H⁰, the number of the super-conducting electromagnets 40 does not correspond to that of FIG. 4. The laser beam generated by a laser device 60 proceeds from right to the left as viewed in the drawing through the pairs of super-conducting electromagnets 40 by the mirror 62 so that it will collide against the $H^0$ beam running from the left to the right. Laser light which did not collide against the beam will be caused to change direction by the mirror 64 to enter the light dump. Firstly, the frequency of the light required for exciting $H^0$ will be as follows by the relativistic Doppler effect when considered based on the system moving with $H^0$ of the relativistic velocity. Namely, with $\omega'=\omega\gamma(1-\beta\cos\theta)$, if $\cos\theta=-1$, the laser beam of 607.7 nm may surprisingly be accepted. Namely, according to the laboratory system, laser beam of 600 nm is considered to be enough. In other words, since the photon of 600 nm corresponds to $\nu=5.0\times10^{14}$, then $h\nu=3.31\times10^{-19}$ J=2.07 eV. The pulse of this light of 1 MW has the beam diameter of 1.0 cm$^2$ and $n\sim1.0\times10^{13}$ cm$^{-3}$. Since $n\sigma\sim2$ cm$^{-1}$, $n\sim2\times10^{13}$ cm$^{-3}$ is necessary and the necessary condition may be sufficiently satisfied if 200 kW is available. It will be somewhat difficult to produce this laser if its output is CW. It is easy to cause the laser beam to be recirculated by mirrors 66 or the like as shown in FIG. 6b and FIG. 6c, and interact with $H^0$ beam. And if it is possible to increase the efficiency by more than two hundred times, the laser beam with the peak of 1 kW (average 180 W at 3.6 ms and 50 Hz) will be sufficient. FIG. 6b illustrates an example in which the mirrors are so arranged that the multi-paths of the laser beam runs in the configuration of X as viewed laterally. FIG. 6c illustrates an example in which the mirrors are arranged in a box-like configuration. In the latter example, plane mirrors or curved mirrors having a bore may be used. Actually, since this laser has a long pulse width, the beam from the semiconductor laser or the like will be amplified by non-linear device. However, no strict limitations are placed on the spectral width.

The life time of this ion is estimated to be 58.8 cm if calculated as based on the range of 2.13 ns from the radiative recombination. This means that the ion and the electron must proceed in parallel. In this case, they are not recombined. The neutral atom which has not been ionized ($H^0$ designated by the reference numeral 18 in FIG. 1) is caused to proceed straight on at the electromagnet for deflection of the next section (not shown in FIG. 1 because of being a paradigmatic drawing, but provided at the output side of the ionizer 16) and bypassed to the beam dump.

As explained earlier, the presence of a wiggler magnetic field is essential. Therefore, the wiggler magnetic field will firstly be explained as follows. It is convenient to use the characteristic parameter of the magnetic field in question, i.e. K value. The K value can be expressed as follows. The K value which is often used for the study of wiggler for a radiation facility is $K=eB\lambda/2\pi m_0c=93.4B\lambda$ in case of electron as calculated by the equation of motion. From this result, by substituting the mass of the proton for that of the electron, $K=eB\lambda/2\pi m_p v=0.055B\lambda$ will be obtained.

If this K value is utilized, the circulating proton beam $H^+$ (see FIG. 1) which passes through the wiggler magnetic field makes a motion of trigonometric function and the maximum deflection angle may be estimated as follows. Namely, $\psi=K/\gamma$ and if B=5 T, $\lambda=0.2$ m, then K=0.55. As described above, if $\gamma=2.60$, then $\psi=K/\gamma=0.02$ rad. However, after having passed the wiggler magnetic field, the deflection angle of the beam is zero. In other words, the trajectory of the circulating proton beam may not be affected.

Then, if $H^0$ which has been injected is ionized in the wiggler magnetic field, the deflection angle of the ionized ion may be simply calculated as $(K/\gamma B) \int B_y dz$ from the equation of motion. Integration is from the ionization site to the terminal end of the wiggler. Since the wiggler of this design has the magnetic intensity of ½ at the both ends, $\psi=K/2\gamma=0.01$ rad is the maximum value. This is the reason for distributing the wiggler magnetic field as illustrated in FIG. 4. Although this deflection angle seems to be large, the site of highest ionizing probability is that of the largest magnetic field, where since the deflection angle is zero, ⅒ seems to be an actually effective value.

As mentioned above, an ionization system which utilizes a method of light excitation by the relativistic Doppler-shifted photon beam in the field of the Lorentz force generated by the interaction between the wiggler magnetic field and the high energy particles may be realized as a novel injection device using a novel charge-exchange device.

It may be noted that the ejection device adapted to eject $H^+$ beam from the ring may be, as shown in FIG. 1, a system in combination of the kicker electromagnet 20 and the septum electromagnet 22. Since this system does not use a foil in principle, it seems that there is no considerable influence over the storage ring for scattering of neutrons.

B. Charge-Exchange Device Described in the Research Report of Japanese Atomic Energy Research Institute, JAERI-Research 97-041

Compared to the report in JAERI-Research 97-040, in the report in JAERI-Research 97-041, a neutralization device (hereinafter referred to as "neutralizer") for the injection device is made capable of converging the beam and also allowing the beam to proceed straight on by restricting the bending by the influence of the magnetic field, while for an ionizer for the injection device the output of the laser is made more efficient and reduced.

The injection device to which the charge-exchange device as described in JAERI-Research 97-041 is applied is constructed from a neutralizer and an ionizer. The neutralizer is disposed at the beam transport section outside of a ring, consists of an electromagnet for convergence and a wiggler, and is adapted to neutralize $H^-$ to $H^0$. The ionizer is disposed at the linear section inside of the ring, consists of a wiggler and an optical resonator, and is adapted to ionize the beam by scattering against the photon beam by use of the Lorentz force provided by the interaction of the wiggler magnetic field and the relativistic velocity of the injected particles. Contrary to the conventional device, the beam trajectory in the ring will not be changed due to bump electromagnet or the like, or scattering will not be caused by the foils. Optimization based on this concept may contribute to a lowering of radio activation due to the beam loss in the injection device for the proton storage ring.

The following description although it is partly overlapped with that of the previous description at Section A, will be repeated in order to facilitate understanding.

It is to be understood that the ring type injection device described in JAERI-Research 97-041 pursues an optimum method under the condition that the beam loss is kept in the order of $10^{-5}$ as a design condition.

1. Injection Device

The configuration of an injection device (or injector) is shown. in FIG. 7. The injection device 112 illustrated in FIG.

7 is constructed from a neutralizer 114 located at the beam transport section external of a ring 110 and adapted to converge the H⁻ beam and neutralize it before it enters the ring, and an ionizer 116 located at the linear section of the ring 110 and adapted to ionize the H⁰ beam. The intense magnetic fields of both the neutralizer and the ionizer work to minimize the variation of the beam trajectory due to the magnetic field by using wiggler magnetic fields. An element such as a bump electromagnet and the like for injection which will vary the particle trajectory in the ring is not used, nor is any foil for charge-exchange.

The neutralizer 114 is adapted to neutralize H⁻ ion from the very powerful proton beam accelerator by means of the Lorentz force generated by the interaction between the relativistic velocity of the H⁻ ion and the magnetic field and direct the same into the ring trajectory. The ionizer 116 is then adapted to allow H⁰ beam to pass through the intense cyclic magnetic field and cause it to collide against the photon in the state of applying the Lorentz force to the H⁰ beam. This makes it possible to ionize the H⁰ beam and put it on the trajectory of the ring 110. Namely, for this injection, two processes, i.e., neutralization of H⁻ (H⁻→H⁰) and ionization (H⁰→H⁺) are required. Besides, such a method as able to direct H⁻ beam in the ring without substantial scattering and not adversely affect the ions which have previously entered and been circulated has to be applied.

1.1. Neutralizer

A method of neutralizing and introducing H⁻ ion into the ring will firstly be explained. If H⁻ ion which is passing at a velocity near to the light speed or at the relativistic velocity is passed through an intense magnetic field orthogonal to the H⁻ beam, the Lorentz electric field having E=V×B is generated and disturbs the electric field associated with the captured electron of the H⁻ to change it to a free electron. In other words, the potential of the electron at the outer circumference forming H⁻ is reduced by the Lorentz electric field so that it may be separated from the hydrogen atom. As explained earlier, FIG. 2 illustrates the neutralizing range of H⁻ ion having the electron stripped as the function of the necessary magnetic field. According to FIG. 2, if H⁻ is caused to pass through the deflection magnetic field of 1 T orthogonal to the H⁻ beam for a distance of some centimeter, the H⁻ beam will be almost neutralized by the Lorentz force: eE=eβγcB, making it possible to reduce the probability of the electron being remained without being stripped to the order of one hundred-thousandth.

Accordingly, as illustrated in FIG. 7, H⁻ beam is caused to firstly pass through the quadrupole electromagnet 118 which is an element of the neutralizer 114 outside of the ring 110 and be converged to the center of the ionizer. It is to be noted that the electromagnet is not limited to the quadrupole electromagnet 118 but any electromagnet which has a function of converging the beam to the center of the ionizer may be used. The tapered wiggler 120 which is an element of the neutralizer 114 is disposed after the quadrupole electromagnet 118 and serves as an electron stripper. By this arrangement, the neutral beam may pass straight on and be introduced in the ring 110. It is also to be noted that before neutralization the beam may be converged by the quadrupole electromagnet 118 for a suitable distance and the sectional shape of the beam at the point of convergence may be elliptical. Assume here that the shape is an elongated elliptical having a longer axis of 3 cm and a shorter axis of 1.5 cm.

In the electromagnet for the electron stripper of the tapered wiggler 120 H⁻ beam is subjected to force until the H⁻ beam is neutralized and, the direction in which H⁰ beam passes straight on is decided depending on the distance in the magnetic field. As explained later, it is the tapered wiggler 120 that has been devised so as to make the deflection width sufficiently narrow, and in this way, the beam may be caused to proceed substantially straightforwardly. If the ions of the remaining H⁻ remain, the charge of the ions may be used to bend the ions by a magnet to direct the same to the beam dump.

Figure 8A:
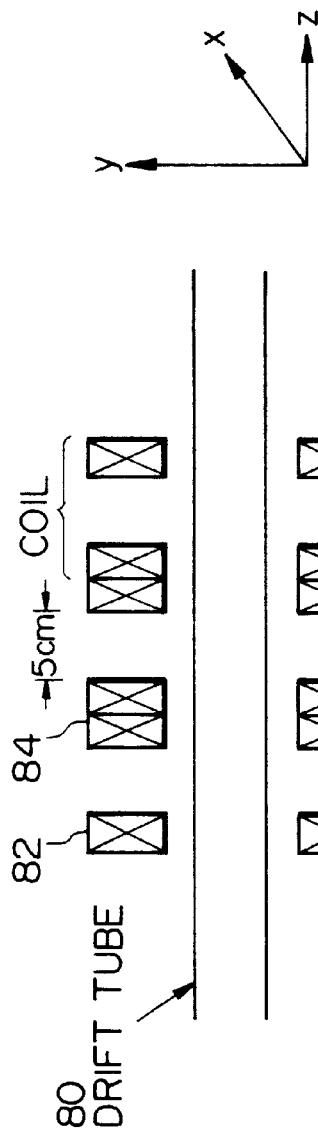
FIG. 8a paradigmatically illustrates an example of configuration of the tapered wiggler according to another embodiment of the prior art.
Figure 8B:
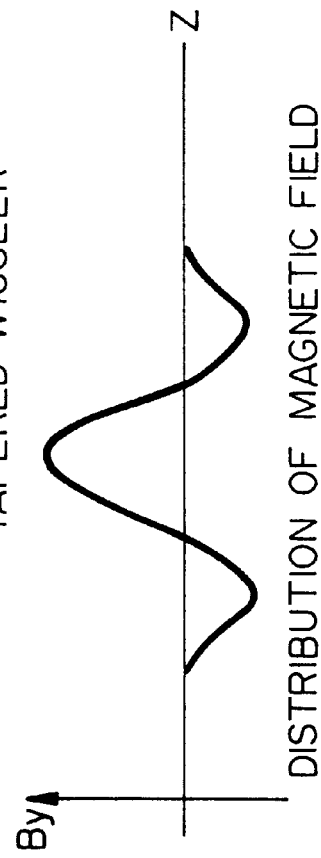
Figure 8C:
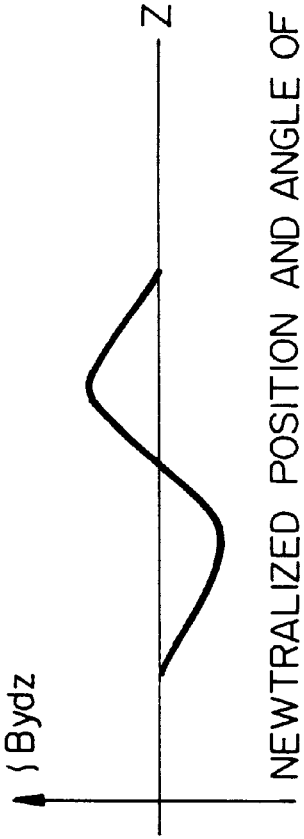

FIG. 8a paradigmatically illustrates an example of the configuration of the tapered wiggler 120. In FIG. 8a, H⁻ beam travels in a drift tube 80 from the left to the right as viewed in the drawing. Pairs of electromagnets 82, 84 are provided above and under the drift tube 80. The peak of intensity of the electromagnet 80 is designed to be half that of the electrode 84. Thus, since the peak of intensity of the magnetic fields at the opposite ends are made smaller than that of the intensity of the middle part of the magnetic field, the wiggler is referred to as tapered in this specification. Consider that in the magnetic field of the tapered wiggler as shown in FIG. 8a, ¼ of the cycle is 5 cm (a cycle is 20 cm), and the peak of intensity is 1 T at the middle section, and the peak of the intensity at the opposite ends is ½ of that at the middle section. Distribution of the magnetic field is as shown in FIG. 8b. Therefore, H⁻ beam which has entered this magnetic field is subjected to cyclically vibrating force. Accordingly, since $$m_p \gamma \frac{dv_x}{dt} = ev_z x B_y,$$

therefore, $$\frac{v_x}{v_z} = \int \frac{eB_y dz}{m_p \gamma v_z},$$

where $v_x$ designates the variation of the speed due to the magnetic field and the range of integration is from the tip end of the wiggler magnetic field to the site of neutralization. The integration value is as shown in FIG. 8c and a method of calculation used at a radiation facility or for development of free electron laser may be utilized. As it can be seen from FIG. 8c or FIG. 15b and FIG. 16c which will be explained later, the deflection angle is equally deviated from the z axis to positive side and the negative side with the z axis as the center. This is because the tapered wiggler has been employed. On the other hand, in case of a normal wiggler having the same intensity of magnetic field at the center as well as at the opposite ends, the overall degree of deflection angle is identical to that in the tapered wiggler as is well known in the concerned technical field, but the deflection is made only in one direction, i.e. the positive side or the negative side. Accordingly, use of a tapered type wiggler makes it possible to reduce the maximum deflection angle to half that compared to a normal wiggler, thereby largely contributing to a reduction of radio activation caused by the deflection angle of the beam. Detailed explanation in this connection will be made in the next paragraph. Considering that the intensity of the magnetic fields at the opposite ends is half of that in the middle section, the beam deflection angle is 0.2 mrad at maximum and zero at the largest magnetic field (or at the central part) having a highest probability of being neutralized. Assuming that up to ¼ of the maximum deflection angle is permissible, the deflection angle becomes 0.5 mrad, or 5 mm for 10 m, which is a small figure. ¼ of the maximum deflection angle corresponds to neutralization within 0.8 cm before and after the maximum magnetic field portion. It is to be noted that after neutralization, the beam is allowed to proceed straightforwardly without being affected by the deflection electromagnet 122 of the ring 110 shown in FIG. 7.

1.2. Ionizer

Referring back to FIG. 7, H⁻ beam is neutralized in the neutralizer 114 and the neutralize H⁰ beam proceeds straightforwardly by inertia and enters the ring 110. Collision against photon in the wiggler magnetic field is used as the means of ionizing the neutral H⁰ beam. Consider now that the beam is rushed into the wiggler magnetic field of the ionizer 116 installed at the linear part of the ring 110. The reason why the wiggler magnetic field is employed is that the trajectory of ion which is already circulating may be less affected even if a strong magnetic field is used.

Wiggler

Figures 9A, 9B:
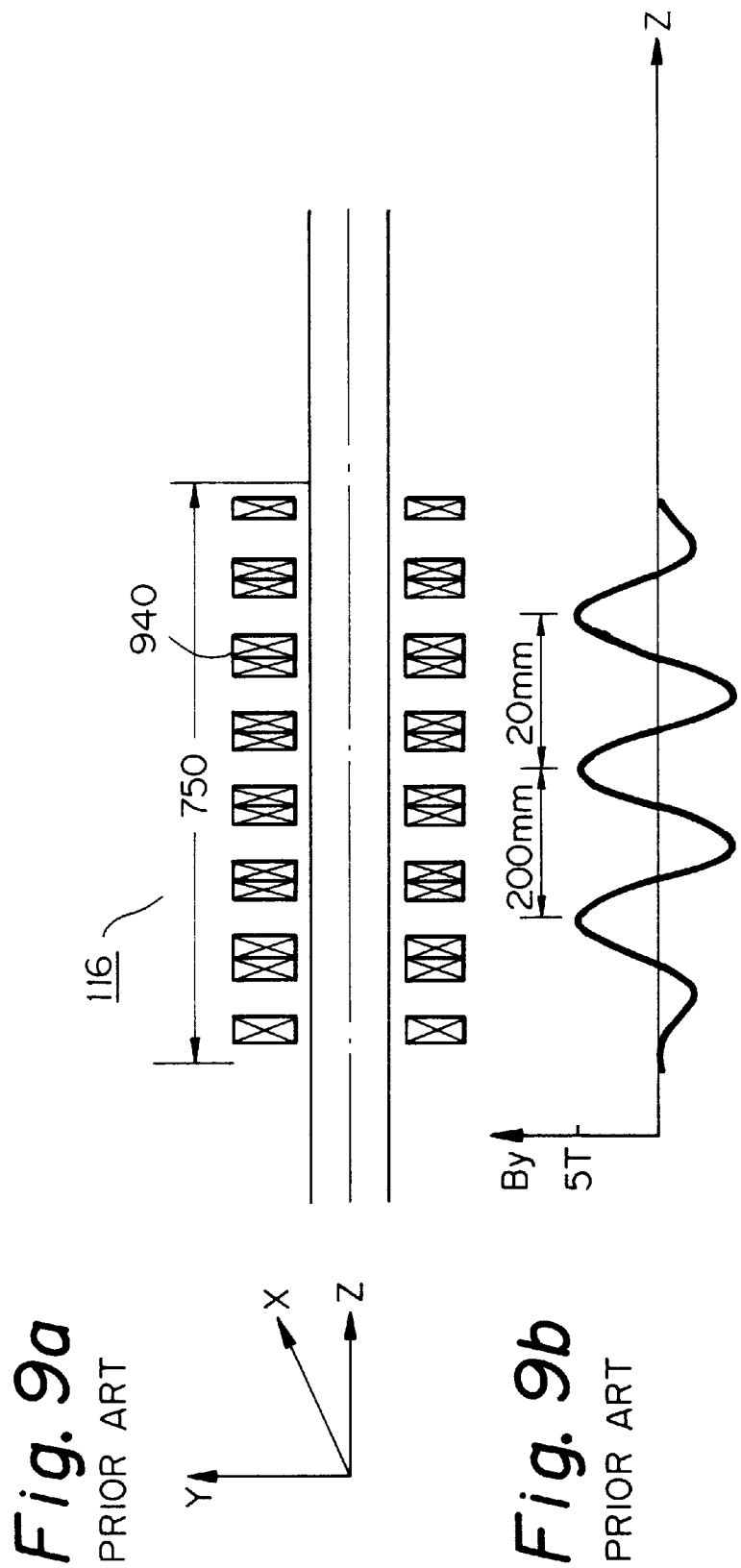

An example of a configuration of the ionizer 16 which generates a wiggler magnetic field is shown in FIG. 9a. According to the configuration shown in FIG. 9a, the wiggler magnetic field is made up of 7 pairs of five superconducting electromagnets 940 (the coil having the inner diameter of 5 cm) with a cycle length of 20 cm and having the maximum magnetic field of 5 T. The intensity of the magnetic fields at the opposite ends are reduced to half so as not to affect the trajectory of ion. The super-conducting electromagnets having a capacity of this order are available as the wiggler from KEK Photon Factory.

The characteristics of the wiggler magnetic field is conveniently available by use of the characteristic parameter of K value. K value which is often used in the case of study on the wiggler for a radiation facility is calculated as follows. Since, in case of electron, $K=eB\lambda/2\pi m_e c=93.4B\lambda$, from the equation of motion, $K=eB\lambda/2\pi m_p c\beta=0.05B\lambda/\beta$ by substituting the mass with that of the proton in this case.

If this K value is used, since the integration described in the preceding paragraph is $(K/\gamma)\sin 2\pi z/\lambda$, the deflection angle may be determined depending on the site being ionized. Since the maximum deflection angle of H⁺ beam is $\psi=K/\gamma$, estimation may be made as follows. Namely, by substitution of B=5 T, $\lambda=0.2$ m, $\beta=0.92$, then K=0.05, whereby $\psi=K/\gamma=20$ mrad. In fact, since the intensity of the magnetic field is ½ at the opposite ends, and the deflection angle at the maximum magnetic field to be ionized is zero, the permissible deflection angle may be around 5 mrad if it is ¼ of the maximum deflection angle. This suggests that it is necessary for an electromagnet for convergence of the beam to be provided at the location of 1 m from the wiggler and also for the site of ionization to be localized.

In addition, in order not to affect the trajectory of the circulating proton beam, it is necessary to be the integration $\int B_y dz=0$ over the total length of the wiggler, so that it is necessary to make the distribution of the magnetic field as shown in FIG. 9b.

A part of H⁰ beam that has entered here may be ionized only by the Lorentz force. The probability of such ionization is as shown in FIG. 5 wherein the excited atom having a principal quantum number n more than 1 is 100% ionized in the time of passing through the maximum value part of the magnetic field (t=5×5 cm/v~0.906 ns). However, most of the atoms are the atoms H⁰ in the ground state, and the intensity of the magnetic field is not enough to ionize, so that they will remain as they are. In view of this, the H⁰ beam has to be excited to the extent of n=more than 1 while it passes through the wiggler magnetic field by any means.

Light Excitation Method

If H⁰ beam in the ground state is excited to the extent of n=more than 1 by colliding against photon, H⁰ beam having the atomic potential being distorted will be ionized by the Lorentz force at the wiggler magnetic field. Assuming that n is the density of H⁰ and $n_e$ is the photon density, and δ takes the numerical value of the system moving with H⁰, if considered from the system moving with H⁰ of 1.5 GeV ($\beta=0.92$), then $$\frac{dn}{dt'} = -n\sigma\beta cn_e.$$

By solving this equation, and considering again based on the laboratory system, and substituting $t'=t/\gamma$, then $n=n_o\exp(-t/\gamma\tau)$, and $\tau=1/\sigma\beta cn_e$.

Assuming $n/n_o=10^{-5}$, t=0.906 ns (the sum of each time during passage through each of five locations of the maximum intensity of magnetic field), $\gamma=2.60$, then $\tau=30.3$ ps is obtained as a necessary condition and then $n_e\sigma\sim1.2$ cm⁻¹ may be obtained.

If the beam is ionized, then it will be H⁺, and passes through the linear section of the ring and the trajectory will be varied as influenced by the magnetic fields such as the deflection electromagnet (the reference numeral 124 in FIG. 7) so that it will enter the ring trajectory.

The optical absorption sectional area for exciting H⁰ beam in the ground state to the level in the order of 2 p is, as well known, $\sigma\sim1\times10^{-13}$ cm² with the light of 121.6 nm (see Discharge Handbook, Electrical Engineering Society (1974) p.19). Assuming that the laser beam is caused to collide against H⁰ from the front face in the system moving with the beam of the relativistic velocity as shown in FIG. 6a, the optical frequency necessary for exciting H⁰ will be as follows owing to the relativistic Doppler effect. Namely, with $\omega'=\omega\gamma(1-\beta\cos\theta)$, and by substituting $\cos\theta=-1$, calculation is made. Then it is shown that the laser is that of 607.7 nm in the visible light range and may be very easily produced. The laser within this range may be readily found and it is a good laser having a wide spectral width although it may be resonance-ionized. Assume here that the laser is of 600 nm.

Since the photon of 600 nm is equivalent to $v=5.0\times10^{-14}$ s⁻¹, $hv=3.31\times10^{-19}$ J. The pulse of this light having 1 MW, 3.6 ms is n~0.59×10¹⁴ cm⁻³, if the sectional area of the beam is 1.7 cm² (the reason will be later explained). Since $n\sigma\sim1.2$ cm⁻¹, $\sigma\sim1\times10^{-13}$ cm², the necessary photon density will be n~1.2×10¹³ cm⁻³, whereby the necessary condition may be satisfied if 205 kW is available. For producing this laser, since it is of a long pulse (3.6 ms, 50 Hz), it seems that production of this laser is difficult in view of the fact that a normal industrial laser is in the order of 10 kW. Consideration is, therefore, necessary to enhance the efficiency to attain the aim.

Optical Resonator

Figure 10:
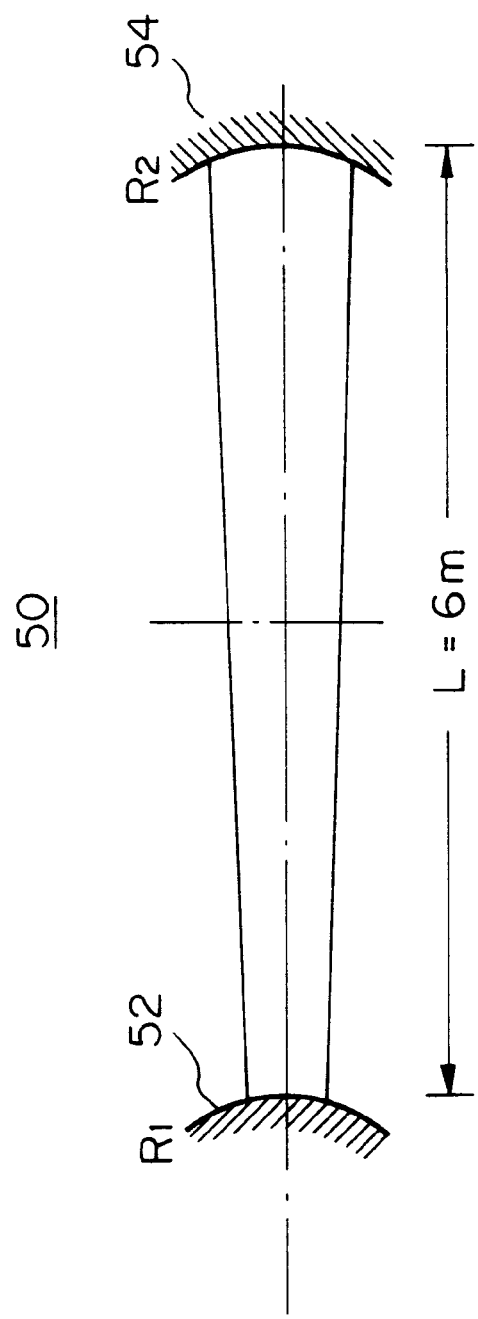
FIG. 10 illustrates a Fabry-Perot resonator comprising a convex face and a concave face which is one example of the optical resonators according to other configuration of the prior art.

An optical resonator which is in use with laser technology is then utilized in order to increase the photon density with a smaller output. In order to increase the diameter of the laser beam to a certain extent, the optical resonator is constructed by a combination of a concave mirror and a convex mirror. A Fabri-Pelot optical resonator 50 comprising a configuration of mirrors having a concave face and a convex face is illustrated as an example of the optical resonator in FIG. 10. In FIG. 10, the reference numeral 52 designates a convex mirror and the reference numeral 54 designates a concave mirror. According to a method of designing an optical resonator (see "The Basis of Optical Electronics" co-translated by Kunio Tada and Takeshi Kamiya, published in 1988 by Maruzen) such an optical resonator having radius of curvature of the mirror, 104 m for the convex mirror and 109 m for the concave mirror, such mirrors being spaced by 6 m from each other is found to be stable. The spot size (the radius) of the optical resonator is 7.35 mm at the central part, and 7.2 mm and 7.5 mm respectively on the mirrors. More specifically, the optical resonator is capable of storing the optical beam having the radius of 7.35 mm or the sectional area of 1.7 $cm^2$ as shown in FIG. 10. The diffraction loss of this optical resonator is less than $10^{-4}$ with the diameter of the mirror being 38 mm. Even if other losses are taken into account, the photon density may be increased by 205 times. Namely, the necessary output of the laser of 1 kW is sufficient. This is the laser which may possibly be realized in consideration of the present state of art. In actuality, since the pulse width is so long that the beam from a semiconductor laser or the like may have to be amplified by a non-linear device. With regard to the spectral width, no severe conditions will be imposed.

Figure 11:
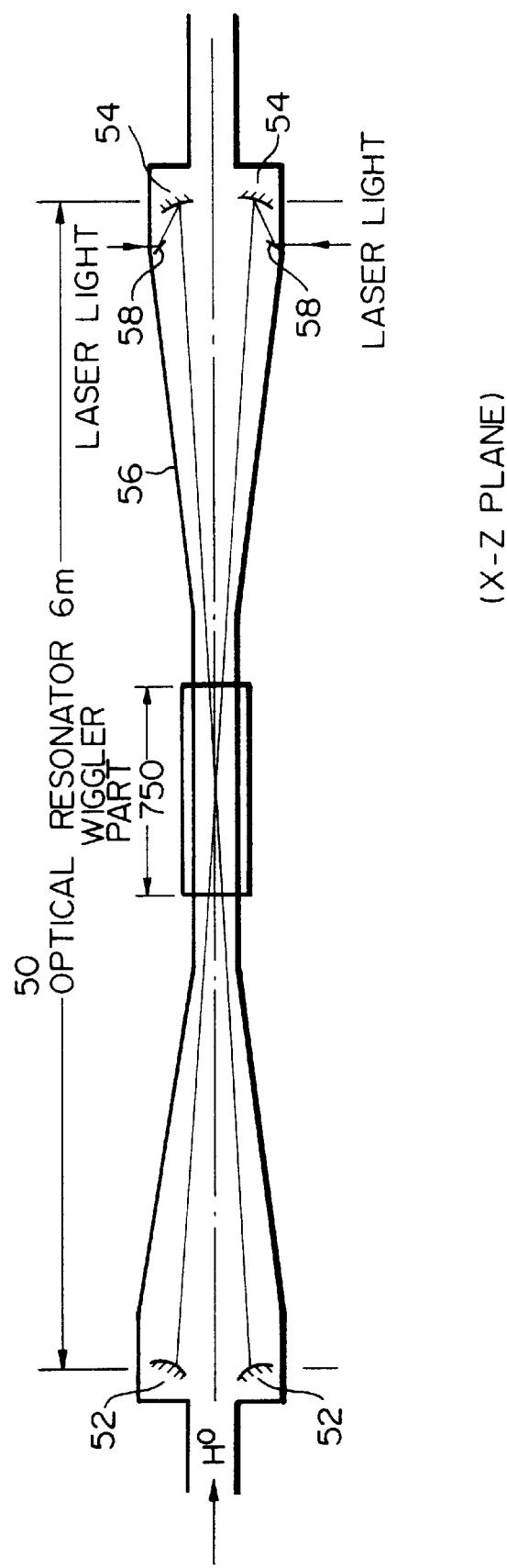
FIG. 11 illustrates an example of a configuration of a vacuum chamber for an optical resonator according to other configuration of the prior art.
Figure 12:
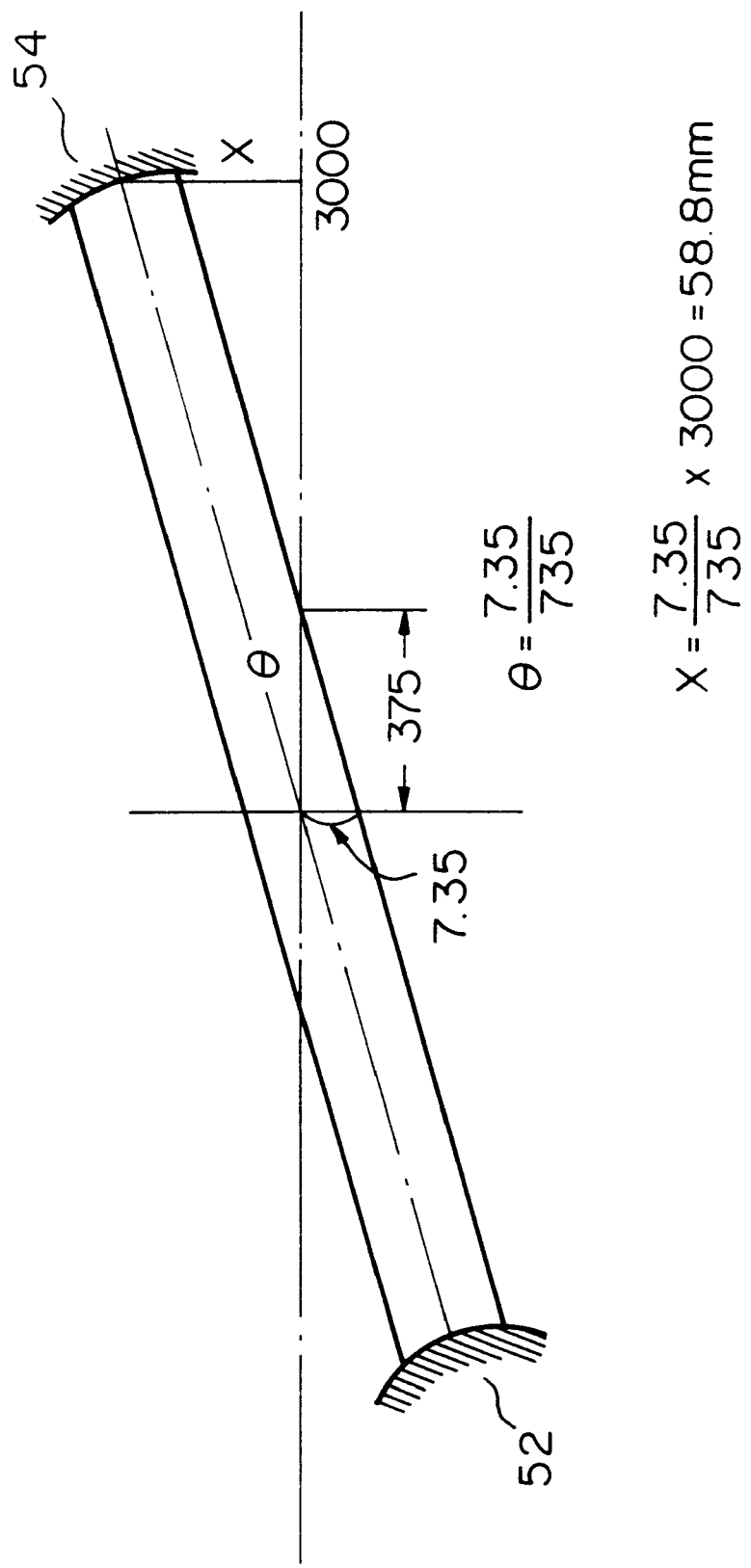
FIG. 12 is an explanatory view of the crossing angle and the mirror diameter of the optical resonator 50 as shown in FIG. 11.
Figure 13:
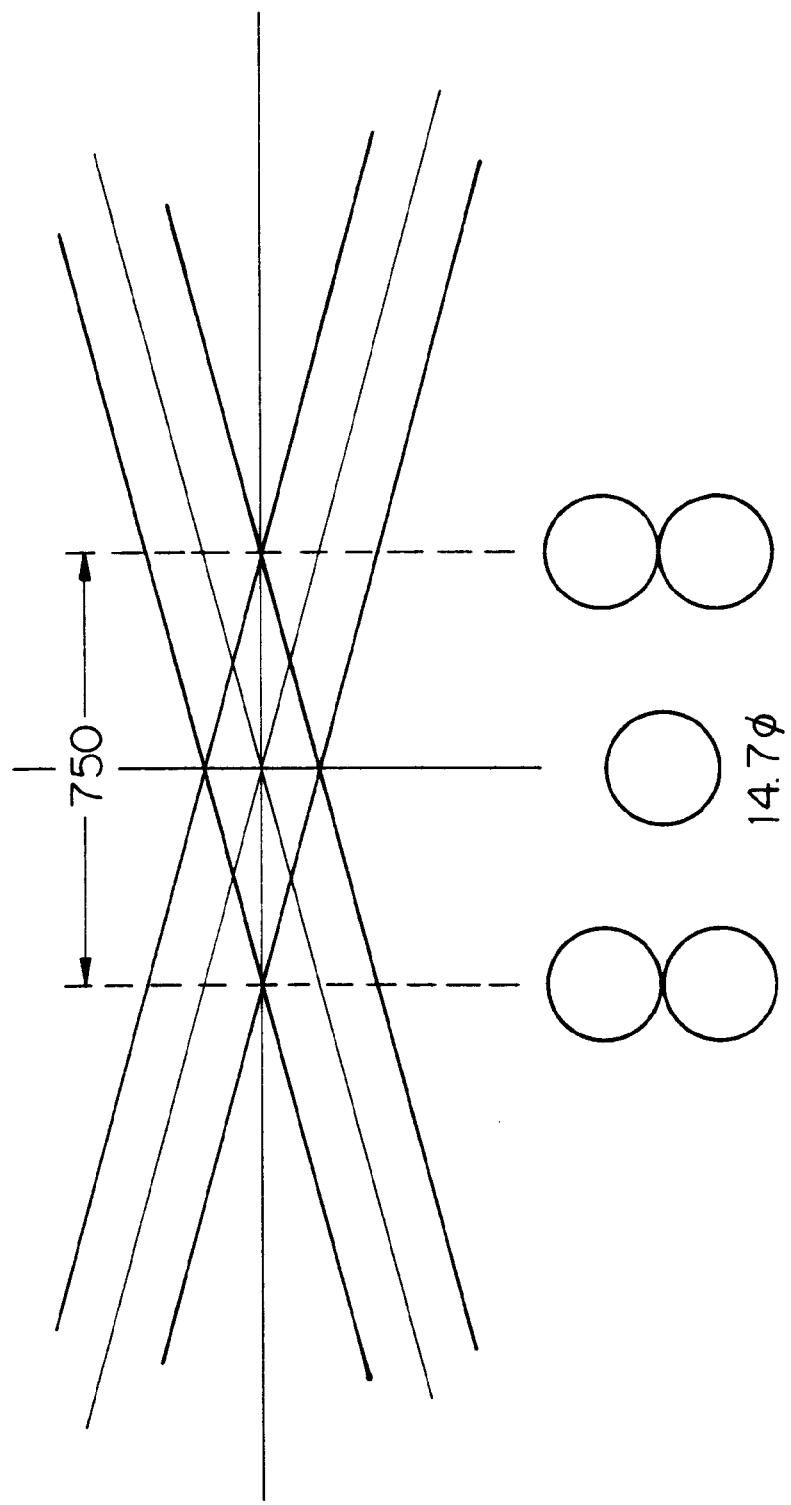
FIG. 13 illustrates the crossing of light and its cross section in the optical resonator 50 as shown in FIG. 11.

It is easy that the optical resonator 50 is disposed in the wiggler magnetic field in a vacuum chamber 56 which is made as shown in FIG. 11 and the optical resonator 50 is interacted with $H^0$ beam for ionization. In FIG. 11, the reference numeral 11 designates a mirror adapted to direct the laser light from the external laser generation source into the interior of the optical resonator 50. Considering FIG. 12 in order to determine the inclination of the optical axis of the optical resonator 50, the radius of the mirror may be kept as 38 mm even if the clearance for the particle beam to pass through is 20 mm. By having the laser light to cross with each other at this inclination, the sectional shape of the light is as shown in FIG. 13, where the cross-section of the $H^0$ beam is converged as elongated elliptical configuration so that the beam may be injected.

The neutral atom which has not been ionized is bypassed to the beam dump at the deflection electromagnet 124 of the next section as shown in FIG. 7.

2. Summary

As explained above, in the neutralizer, the beam while it is in the state of $H^-$ beam is converged by the quadrupole electromagnet and subsequently directed in the tapered wiggler where it is neutralized. Although the Lorentz force by the wiggler magnetic field is effective as an electron stripper, it may be subject to some deflection depending on the location of neutralization. From this view point, optimization of the wiggler magnetic field is required, but 0.2 mrad corresponds to 2 mm for 10 m, which is already small enough. It is necessary to design the deflection magnetic field part of the ring in an optimum manner in respect of the strength in order to avoid ionization of $H^0$ in this part. It is further to be noted that the photon beam is converged in an elliptical shape at the central part of the ionizer so as to attain an efficient use of the photon beam.

Ionization by light excitation method by use of an optical resonator is proposed for the ionizer. It can be said that presence of a wiggler magnetic field is effective for exciting the neutral atom in the ground state to one step higher level, which has mitigated the load over the laser considerably. The advantage of the beam of 1.5 GeV is used to the maximum extent and also use of the Lorentz force, application of the relativistic Doppler effect and so forth have largely contributed to ionization. It has been turned out that use of a wiggler magnetic field and photon has reduced the adverse affect such as scattering of the circulating ion and is extremely advantageous.

The beam loss attained by the novel injection device comprising the neutralizer installed outside of the ring and the ionizer installed at the linear part of the ring is $10^{-5}$ which is extremely lower compared to the method of a prior art. The neutralizer is adapted to converge the beam by a combination of the quadrupole electromagnet and the like for convergence and a wiggler magnetic field and allow the beam to proceed straightforwardly by restricting bending of trajectory due to the magnetic field to conduct the same to the ionizer.

The ionizer is the system for ionization by photon beam by use of the wiggler magnetic field and the optical resonator. The photon laser may be the laser in a visible range because the relativistic Doppler effect is utilized, whereby the output of the laser required by the optical resonator may be reduced. It is one of the features of this system that the laser beam may be made more efficient by ionization effect provided by a wiggler magnetic field and the influence over the circulating ion may be reduced to minimum.

C. Charge-Exchange Device Described in the Japan Atomic Energy Research Report, JAERI-Research 97-057

The charge-exchange device described in JAERI-Research 97-057 is the improvement upon the device described in JAERI-Research 97-040 and 97-041 in that radio activation caused by the deflection angle of the beam has been considerably reduced.

An injection device to which the charge-exchange device described in JAERI-Research 97-057 is applied is constructed by a neutralizer and an ionizer, to which respectively charge-exchange method by use of a wiggler magnetic field is applied. The neutralizer is installed at the beam transport section outside of the ring, consists of an electromagnet for convergence and a wiggler magnetic field, and is adapted to neutralize $H^-$ to $H^0$. The ionizer is installed at the linear part of the ring, consists of a wiggler and an optical resonator, and is adapted to ionize $H^0$. Both of the neutralizer and the ionizer utilize the Lorentz electric field by the injected particles having a relativistic velocity. Further for ionization, the relativistic Doppler effect and resonance absorption of the laser beam are utilized to the maximum extent to execute charge-exchange efficiently. The intense Lorentz electric field provided by a wiggler magnetic field is capable of enhancing the laser beam charge-exchange efficiency remarkably. There are no scattering due to foils or no adverse influence over the circulating ion as seen in the prior art. Accordingly, the beam spill caused by the beam deflection angle at the injection device of the proton storage ring may be eliminated and radio activation may be then extremely reduced effectively.

In the following description, the description which has been made in the preceding sections A and B may partly overlap with the present description, but is repeated in order to facilitate understanding.

1. Preface

As already described in the section titled the Technical Field of the Invention, the proton storage ring included in the neutron scientific research plan of the Japan Atomic Energy Research Institute is designed to receive H⁻ beam of 1.5 GeV ($\beta$=0.92) having a peak of 30 mA for a time of 3.6 ms from the super-conducting linear accelerator and enter and store the same in the ring. Subsequently, in this storage ring, the beam is compressed to the beam in the order of 0.5 $\mu$s and is fed to the target which will be the neutron source in the form of the pulse of 50 Hz having a peak of 100 A.

Since the injection device for this storage ring is adapted to inject the beam of a large output which has never been experienced before, all possible measures have to be taken in respect of countermeasures against leakage of the beam at the injection part and for reducing radio activation. Therefore, a method of injection incorporating a novel concept has to be developed. Furthermore, to take advantage of employment of a super-conducting linear accelerator for enabling long pulses to be accelerated outlined in the above-mentioned plan, multi-turn injection of pulses having a long width is necessary and for this purpose, measures for keeping the beam spill extremely low should be considered.

For this purpose, an injection device with low radio activation by use of a magnetic field and light is described in JAERI-Research 97-040 and 97-041 in place of the charge-exchange method by use of foils according to a prior art. More specifically, this is the method of electron desorption (neutralization) or ionization by causing the hydrogen (H⁻, H⁰) beam having a relativistic velocity to pass through a wiggler magnetic field and effect an electron desorption (or neutralize) or ionize the beam by a Lorentz electric field (E=v×B) generated during such passage of the beam. At this time, the light is used for supplementing the shortage of the Lorentz electric field.

However, according to the report in JAERI-Research 97-040 and 97-041, a strong magnetic field is used for aiming at efficient reduction of the beam loss, and it was not a positively taken measure to narrow the beam deflection angle caused by employment of a strong magnetic field. More specifically, in JAERI-Research 97-041, the deflection angle was in the order of 5 mrad which was not small as suggested by provision of an electromagnet for convergence and necessity of localizing the site of ionization. Accordingly, in order to reduce radio activation, which is one of the most important object as described in this report, it is of utmost importance to narrow the beam deflection angle. For this purpose, the magnetic field through which the beam in the charged condition passes is made weak or the distance of the magnetic field through which the beam in the charged condition passes is made shorter. Therefore, according to the report in JAERI-Research 97-057, the concept which has been taken till now is completely reversed to further improve the idea employed in JAERI-Research 97-040 and 97-041. As the result, such a method of charge-exchange is adopted as the beam spill is reduced to the extreme extent and the beam deflection angle is limited to less than a certain limit value. And, excitation by the photon beam is used to supplement the ionization in a weak magnetic field.

Figure 14:
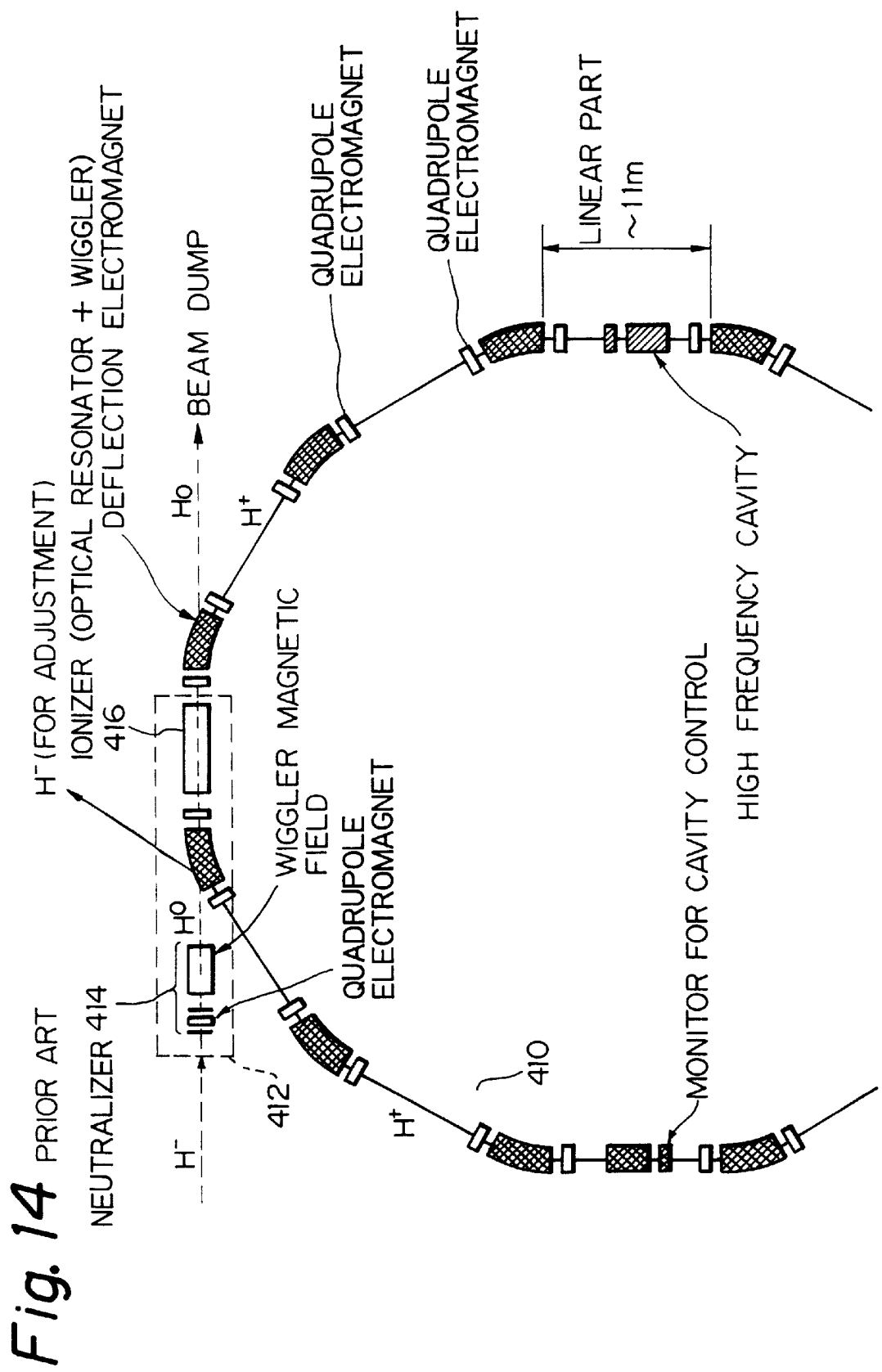
FIG. 14 illustrates an arrangement of an injector to which a charge-exchange device according to a further configuration of the prior art is applied.

The injection device disclosed in JAERI-Research 97-057 is of a two-step system in which, as shown in FIG. 14, the neutralizer 414 adapted to converge H⁻ beam and neutralize the same before it enters the ring 410 and the ionizer 416 installed at the linear part of the ring 410 and adapted to ionize H⁰ beam are provided along a straight line. The neutralizer 414 is adapted to cause H⁻ beam to pass through the cyclic wiggler magnetic field to desorb the electron and neutralize the beam. The neutralized H⁰ beam is caused to proceed straightforwardly and enter the ionizer 416 installed at the linear part in the ring 410. In the ionizer 416, the H⁰ beam is caused to collide against the photon beam and absorb it to be excited. Further, at the same time, the H⁰ beam is ionized by means of the Lorentz electric field by the wiggler magnetic field. As the consequence, H⁰ beam is ionized and put on the trajectory of the ring 410. H⁰ beam that has not been ionized is caused to proceed straightforwardly to enter the beam dump.

According to this method, the influence over the deflection angle is reduced to minimum by employing a weak wiggler magnetic field. Furthermore, no adverse affect is imposed on the trajectory of H⁺ ion which has previously entered the ring 410 and is circulating. Since the photon beam for excitation executes an interaction only with the electron of the hydrogen atom, the influence over the trajectory of the beam in itself, such as an increase in emittance of the hydrogen beam and increase in the deflection angle, may be kept at minimum. Accordingly, it is possible for the deflection angle to be made small as a whole, while H⁺ is charge-exchanged and enters the ring 410.

However, the specification of the laser which is the generation source of the photon beam for this excitation is required to be greater than is practically available at the present stage in respect of the large output and the wave length beyond that of the range of vacuum ultraviolet rays, if a conventional method is applied. In view of this fact, according to JAERI-Research 97-057, resonance ionization method (resonance excitation method) which has been studied in the study on atomic energy (laser isotopic separation) or the study on nuclear fusion (neutral particle heating, plasma diagnosis) and so forth has been introduced and an extremely efficient method of charge-exchange is employed. Furthermore, by employing an optical resonator, the photon density is tried to be increased and the output of the laser is tried to be reduced. In addition, as explained later, since there is such a relation as $n_v = n_v'/\gamma$ between the photon density $n_v$ in the laboratory system and the photon density $n_v'$ in the system moving with H⁰ (static system), which implies that the photon density may be increased by $\gamma$ times by Lorentz contraction. Accordingly, the photon density may further be increased by Lorentz contraction, whereby the output of the laser may be further reduced. With regard to the wave length of the laser, the fact that the hydrogen beam H⁰ has a relativistic velocity is used to shorten the wave length by means of the relativistic Doppler shifting (the laser beam may be of a long wave length). Therefore, the wave length of the laser may be within the visible light range, which mitigates the requirement of the specification of the laser.

Four design conditions are required for the ring type injection device described in JAERI-Research 97-057.

The first design condition is to keep the deflection angle of the hydrogen beam which may be formed at the time of charge-exchange and which forms one of the causes resulting in radio activation at the vessel wall, to be less than 1 mrad (1 cm for 10 m). The so-called beam spill which collides against the vessel wall is defined for this purpose to be the beam having a deflection angle larger than this limit value.

The second design condition is to employ the method of resonance excitation by the photon beam for ionization in a weak wiggler magnetic field.

The third design condition is to keep the beam which can not be ionized (defined to be beam loss) less than $10^{-5}$. It has to be understood, however, that even such a beam which has not been charge-exchanged and might result in beam loss may be directed to the beam dump and in this case, the vessel wall will not be subject to radio activation.

The fourth design condition is to prevent increase of emittance of the beam due to the deflection angle and at the same time to prevent the trajectory of the ion circulating in the ring from being influenced by the deflection angle throughout the above-mentioned processes.

The optimum configuration which may satisfy the above-mentioned four design conditions will now be explained.

2. Neutralizer

The injection device 412 illustrated in FIG. 14 is designed to execute two processes, i.e. neutralization of $H^-$ ($H^- \rightarrow H^0$) and ionization ($H^0 \rightarrow H^+$), both of which charge-exchange (desorption of electron and ionization) are done in a wiggler magnetic field.

Definition of Terminology Regarding Charge-Exchange Rate

Firstly, the terminology common to two processes of charge-exchange is here defined. The injected beam intensity ($I_i$, the initial value $I_{io}$), the beam intensity after charge-exchange ($I_c = I_{io} - I_i$), then, the charge-exchange rate is $I_c/I_{io}$ and $I_i/I_{io}$ means the rate of the beam not charge-exchanged, of which final value is defined to be the beam loss rate. Furthermore, $I_c$ is divided into the 2 categories, that is, the one in which the deflection angle due to the charge-exchange is larger than a certain limit value $\psi_{crit}$, or ($I_s$) and another in which the deflection angle is smaller than the limit value, or ($I_g$). Namely, $I_c = I_s + I_g$, and $I_g/I_{io}$ are defined as the injection exchange rate and $I_s/I_{io}$ is defined as the beam spill rate. In other words, if the deflection angle after charge-exchange is large, this case is understood to be the beam spill rate. Hence, the configuration of the low radio activating injection device for reducing the beam spill rate will now be explained.

Configuration of the Magnetic Field for Charge-Exchange (Wiggler Magnetic Field)

Figure 15A:
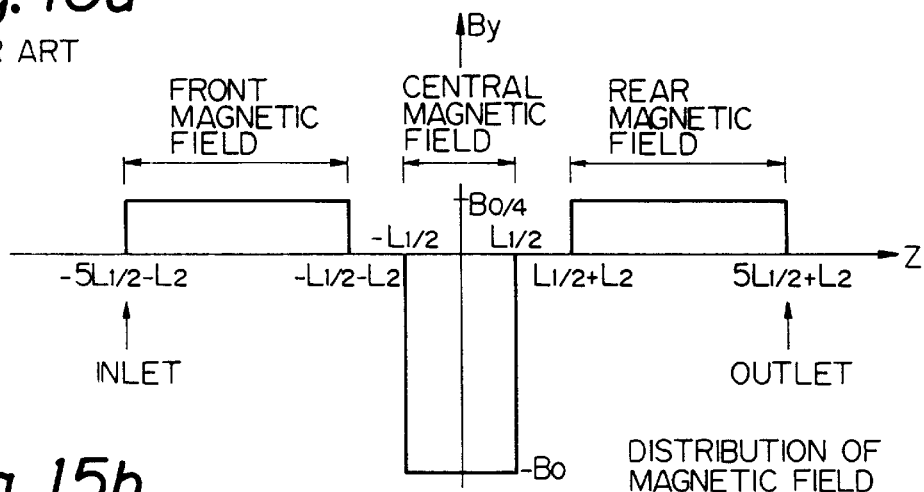
FIG. 15a illustrates the distribution of the magnetic field (wiggler magnetic field) for exchange of charge in the injection and ejection device as shown in FIG. 14.
Figure 15B:
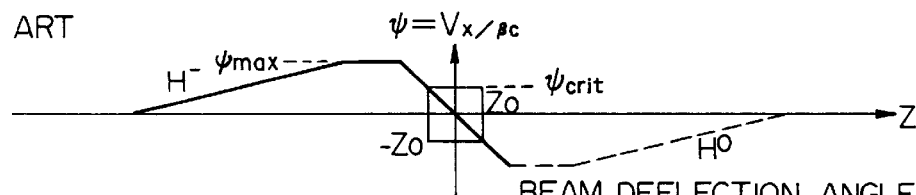

The configuration of the magnetic field for the charge-exchange (wiggler magnetic field) is as shown in FIG. 15a through FIG. 15e. In FIG. 15a, the distribution and terminology of the magnetic field are defined and the rectangular distribution and the length of the magnetic field are illustrated for facilitating integration. The intensity of the central part of the magnetic field is designated as $-B_0$, the length is $L_1$, the intensity of the front and rear magnetic fields which are arranged symmetrically to each other are designated as $B_0/4$, the length is $2 L_1$ and the length of site of zero magnetic field (or free space) is designated as $L_2$. This distribution of the magnetic fields is so determined as not to affect the deflection angle of the charged beam passing through the entire zone of this magnetic field. In case of such a beam as entering the wiggler magnetic field and being exchanged of the charge on the way, the deflection angle is determined at the point (z) of the charge-exchange. For example, as shown in FIG. 15b, such $H^-$ beam that has entered this magnetic field is subjected to the magnetic force at the inlet and neutralized. After that it will not be subject to the magnetic force. Accordingly, the equation of motion is expressed as follows;

$$m_p \gamma \frac{dv_x}{dt} = ev_z x B_y.$$

From this equation, the deflection angle $\psi$ may be expressed as follows;

$$\psi = \frac{v_x}{v_z} = \frac{v_x}{c\beta} = \frac{e \int v_z B_y dt}{m_p \gamma c \beta} = \frac{e}{m_p \gamma c \beta} \int B_y dz,$$

wherein $v_x$ designates the variation of the velocity as caused by the magnetic field and constitutes the velocity component orthogonal to the beam. The range of integration is from the inlet to the point of neutralization (z point). Namely, the left side of the equation mentioned above means the beam deflection angle as the function of the point of neutralization (after this point, no force is imposed), and the maximum value is $\psi_{max} = eB_o L_1/2 \, m_p \gamma c \beta$. If the beam has passed through the entire length of the magnetic field in the form of ion right from the beginning, it has no deflection angle, or zero. It is further to be noted that if $K = eB_o L_1/2 \, m_p c \beta$ equivalent to the undulator parameter which is used for development of free electron laser or radiation light is applied, then it can be expressed as $\psi_{max} = K/\gamma$.

Figure 15C:
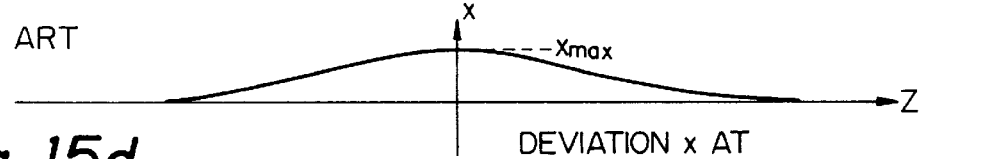

Furthermore, the deviation shown in FIG. 15c is obtained by the equation, i.e., the deviation in the x direction $x = \int v_x dt = \int \psi dz$. Here, $X_{max} = \psi_{max}(L_1 + L_2)$ is obtained, and $L_2$ is used for adjusting $x_{max}$.

Figure 15D:
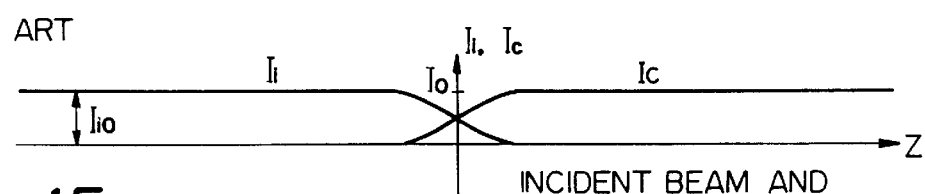
Figure 15E:
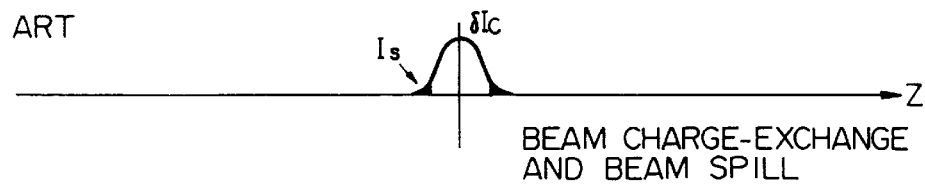

Considering now the intensity of the magnetic field $B_0$ so that the charge-exchange may be produced in the middle magnetic field, the variation of the intensity of the beam that has been injected and the beam of which charge is to be exchanged will be expressed as shown in FIG. 15d and FIG. 15e. It is to be noted here that $z_0$ (see FIG. 15b) is the point where the deflection angle will be $\psi_{crit}$ and the beam that has been charge-exchanged outside of $\pm z_0$ will become the beam spill.

Neutralization by Wiggler Magnetic Field

With the configuration of the magnetic field as shown in FIG. 15a, the condition in which the beam spill may be smallest possible is searched. Such a condition is as follows. More specifically, (1) Neutralization is almost completed within the length $L_1$ at the magnetic field $B_0$. But, neutralization is not executed within the length $2 L_1$ at the front magnetic field having the intensity of $B_0/4$. Provided, the injection beam is expressed by $I_i=I_{io}\exp(-t/\gamma\tau)$, and the charge exchange rate is $(I_{io}-I_i)/I_{io}=1-10^{-5}$, which is expressed as "substantially neutralized". Namely, the beam loss rate in this case is $I_i/I_{io}1\times10^{-5}$.

(2) The limit deflection angle at which the beam spill is caused is $\psi hd$ crit=1 mrad. The maximum deflection angle $\psi_{max}$ at the wiggler magnetic field is to be smaller than $\psi_{crit}$. Accordingly, all of the beams of which charge has been exchanged will not necessarily become the beam spill but injected in the ring.

(3) The condition (2) is given the first priority relative to the condition (1). Namely, to make the beam spill rate small is treated as the first priority. The idea is here changed in such a manner as although it is desirable for the beam loss rate of the beams remaining without being neutralized to satisfy the condition (1), but let it leave as it is. However, since the beam loss contains certain charge, it will be directed to the beam dump by replacing the rear magnetic field by a weak deflection magnetic field so as to prevent radio activation.

From the condition (2), $\psi_{max}=K/\gamma$, and $K=eB_0L_1/2m_pc\beta=0.174B_0L_1$. In order to attain $\psi_{max}=1$ mrad, $B_0L_1=0.015$. Accordingly, for example $B_0=1$ T, $L_1=0.15$ m, or $B_0=0.5$ T, $L_1=0.03$ m. The former case is hereby taken into consideration.

In case of $L_1=c\beta t=0.015$, the time required for the beam to pass this is $0.55\times10^{-10}$ s. Here, those parameters of the system moving with $H^0$ (the static system) of 1.5 GeV ($\beta=0.92$, $\gamma=2.60$) is appended with "'". Then in case of the static system, $t'=t/\gamma=0.21\times10^{-10}$ s. The range of neutralization is shown in FIG. 2 as the function of the magnetic field. Namely, the beam loss rate is expressed as $I_i/I_{io}=\exp(-t'/\gamma)$. Therefore, assuming the magnetic field $B_0=1$ T, since the life time of neutralization is $\tau=1.78\times10^{-12}$ s, then the charge-exchange rate is $(I_{io}-I_i)/I_{io}=1-7.5\times10^{-6}$, which is almost 100%. Namely, the beam loss rate is also small as $I_i/I_{io}=7.5\times10^{-6}$. At the front magnetic field of the intensity of the magnetic field $B_0/4=0.25$ T, $\tau=6.0\times10^{-4}$ s is. At this front magnetic field, the charge-exchange rate is the order of $(I_{io}-I_i)/I_{io}=1-10^{-7}$, which is extremely so small as to be negligible.

For information, in case of $B_0=0.5$ T, $L_1=0.03$, the time t required for passage therethrough is $1.1\times10^{-10}$ s. In the case of the system moving with the beam, $t'=t/\gamma=0.42\times10^{-10}$ s. From the magnetic field being $B_0=0.5$ T, the life time to the neutralization is $\tau=1.84\times10^{-9}$ s. In this case, the charge-exchange rate is $(I_{io}-I_i)/I_{io}=2.8\%$, which is too small to be for practical usage.

With regard to $L_2$, there is no special action due to $L_2$ in the neutralizer, and thus $L_2$ may have any suitable length.

In summary of what has been described above, the design conditions for a neutralizer have been entirely satisfied by the wiggler magnetic field of $B_0=1$ T, $L_1=0.015$ m. It is to be noted that the rear magnetic field of this neutralizer may be replaced with a deflection magnetic field which directs the beam loss to the beam dump.

3. Ionizer $H^-$ beam is neutralized by the neutralizer 141 (FIG. 14) and the neutral beam $H^0$ is caused to proceed straightforwardly by inertia and enters the ring 410. Then the neutral beam $H^0$ will move rapidly into the wiggler magnetic field provided at the linear part of the ring and at the same time interacts with the photon beam.

Wiggler Magnetic Field and Photon Beam

The configuration of the wiggler magnetic field is as shown in FIG. 15a where $B_0=1$ T, $L_1=0.015$ m are applied.

The neutral beam $H^0$ may pass through the front magnetic field without being influenced at all. The relative position between the distance of the interaction with the photon and the position of the wiggler magnetic field may be considered as FIG. 16a. Namely, $H^0$ beam is excited by use of the photon during passage through L1, and at the same time is ionized by the Lorentz electric field generated by the interaction with the central magnetic field. The ionized beam is then subjected to the deflection angle at the point of ionization z, but the deflection angle is less than, $\psi_{max}=1$ mrad, which satisfied the above-mentioned condition (2).

Considering the static system. Since the interaction time with the photon is $t'=L_1/\gamma\beta c\sim0.21$ ns, in order to efficiently ionize the $H^0$ beam in the ground state that has been injected, the beam has to be excited to the principal quantum number of 3. The reason is that the probability of the transient ionization of $H^0$ beam of the principal quantum number of 3 is extremely short as $\tau'=1\times10^{-12}$ s as shown in FIG. 5, and thus the $H^0$ beam is excited and immediately ionized at the magnetic field of 1 T. In other words, if an intense photon beam necessary for exciting $H^0$ beam to the principal quantum number of 3 within 1.5 cm is available, it will be sufficiently ionized by the Lorentz electric field at the central magnetic field $B_0=1$ T. Furthermore, in order to efficiently excite the beam in the magnetic field having a short interaction distance $L_1$ by the photon beam, it is necessary to make it efficient by enlarging the absorption sectional area by, for example, amplifying the photon density by an optical resonator, adopting a method of resonance excitation and so forth rather than effecting the direct collision of the laser beam. Accordingly, it is necessary to obtain the necessary intensity of the beam. This will be explained as follows.

Wave Length of the Light for Excitation

Figure 17:
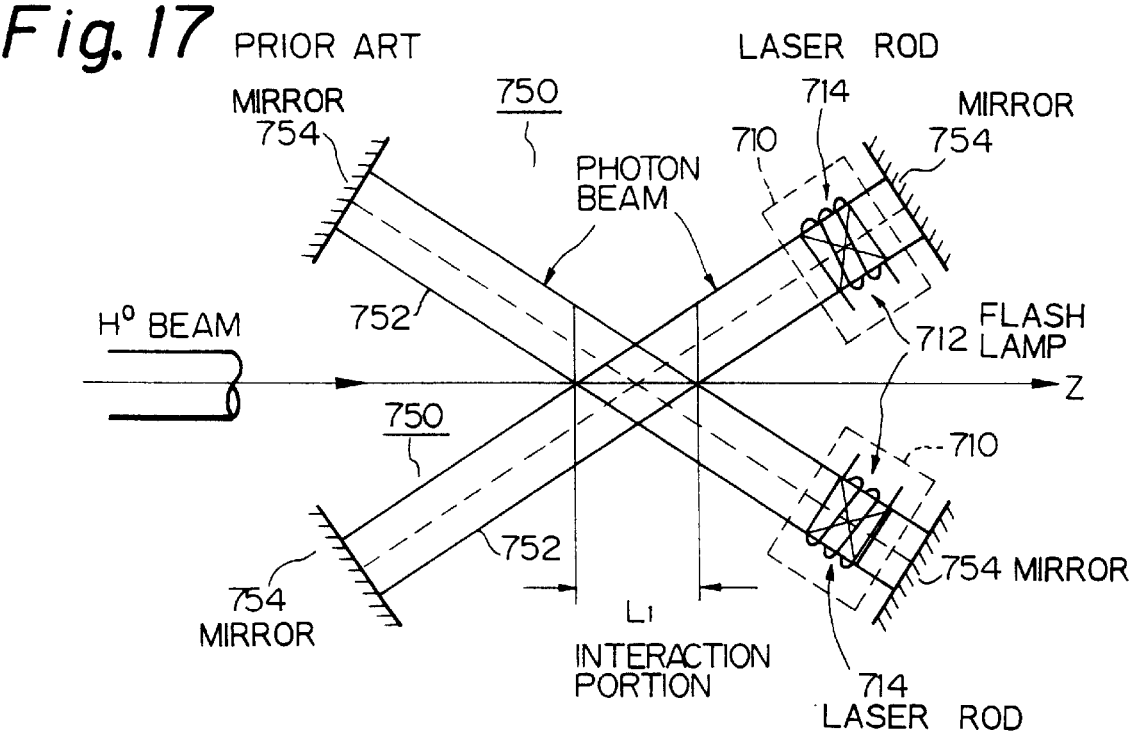
FIG. 17 is a conceptual view of an optical resonance part according to a further configuration of the prior art.

The light necessary for exciting $H^0$ beam in the ground state to the level of n=3 is the well-known Lyman Series $L_\beta$ beam, having a wave length of 102.53 nm. However, since this wave length is the value in the system moving with the $H^0$ beam having a relativistic velocity, in the laboratory system, this light may be the laser beam having a wave length of about five times (450–510 nm) by selecting the crossing angle of $H^0$ beam relative to the photon beam by means of the relativistic Doppler effect. Furthermore, the laser beam is not directly used as the photon laser beam for excitation. As shown in FIG. 17, the optical resonators 750 accommodates the laser oscillation part 710 and the $H^0$ beam as the absorber adapted to absorb the laser beam so as to enhance the photon density to enhance thereby the efficiency.

Here, the optical resonator 750 shown in FIG. 17 will be explained. FIG. 17 illustrates the configuration of using 2 sets of the optical resonators 750. It is to be noted that the present invention is not limited to the number of sets of the optical resonators to be used. The optical resonator 750 comprises the laser oscillation part 710, the vacuum tube 752, and a pair of the mirrors 754 provided at the opposite ends of the vacuum tube 752 oppositely to each other. The laser oscillation part 710 is provided with a flush lamp 712 and a laser rod 714. As already known in the technical field concerned, a laser rod 713 is kept in an excited condition by the flush lamp 712 so that the laser rod 713 will generate laser beam in the vacuum tube 752. This laser beam is reflected by a pair of the mirrors 754 and resonated in the vacuum tube by reciprocal motion, resulting in enhancing the photon density. The H⁰ beam which runs from the left to the right as viewed in FIG. 17 is caused to collide against the photon beam of the laser beam in the interaction part $L_1$ to be excited.

Figure 16A:
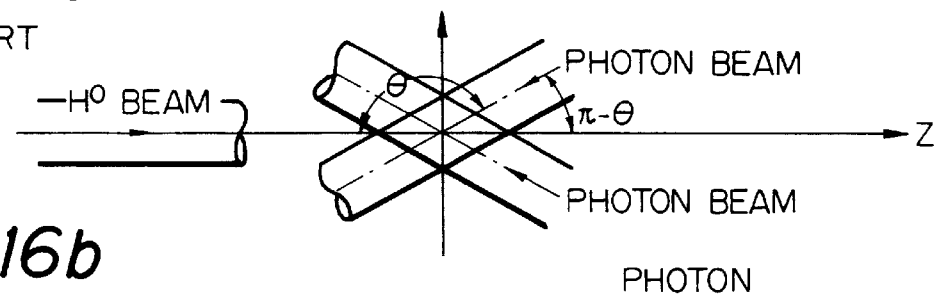
FIG. 16a is an explanatory view for describing the interaction between the neutral beam $H^0$ and the photon in an ionizer according to a further configuration of the prior art and illustrating the relative positional relation between the interaction distance relative to photon and the position of the wiggler magnetic field.
Figure 16B:
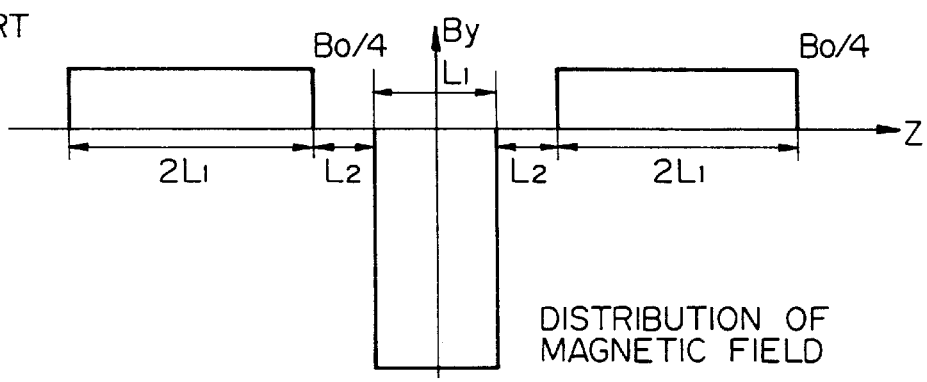
Figure 16C:
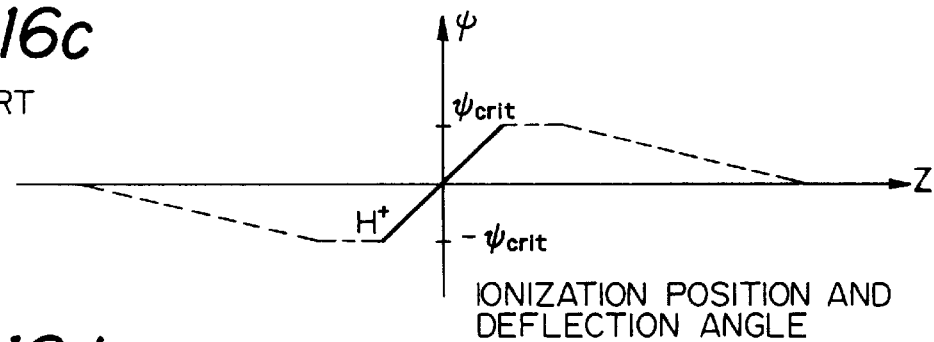
Figure 16D:
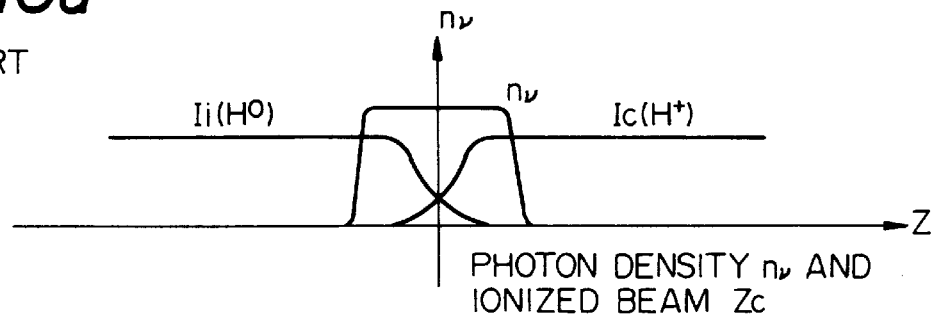

Let us determine the wave length of the laser beam. Among many solid laser, the laser containing impurities $Tm^{3+}$ in YLF which seems to be easily made as a large output is selected as the laser rod 710 (see FIG. 17) (the laser oscillation part). Let us determine the angle of the photon beam to cross with the laser rod in this case. If the laser beam (453 nm) is caused to collide against H⁰ at the angle θ as shown in FIG. 16a, the light having a wave length of 102.53 nm (λ') will be, as the result of the relativistic Doppler effect, $\lambda=\lambda'\gamma(1-\beta\cos(\theta))$, and $\cos(\theta)=-0.76$ is then obtained, and thus to $(\pi-\theta)=0.70$ rad (40°).

Although the optical resonator requires mirrors and an optical system of lenses for enlarging the diameter of the photon beam to a certain extent, the detailed description of such requirement is omitted here.

Probability of Induction Transition

Considering the static system, the optical resonator is caused to move toward conversely to the ion sources at the velocity of βc. This corresponds to the ionization when irradiated by the pulse of $t'=t/\gamma=L_1/\gamma\beta c$.

Figure 18:
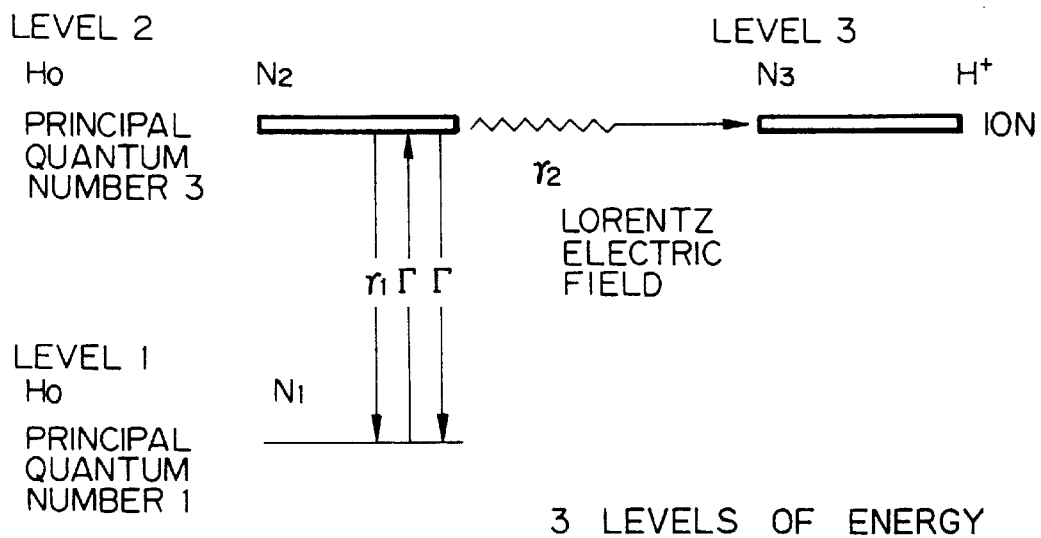
FIG. 18 illustrates the different levels of energy for showing the ionization process according to a further configuration of the prior art.

Let us now consider the three levels of energy as shown in FIG. 18. Here, $\gamma_1$ is the probability of the natural radiation from the level 2 (the principal quantum number being 3) to the level 1 (the ground state), and $\gamma_2$ is the probability of ionization of the atom in the level 2. If the life time in the magnetic field is τ', then $\gamma_2=1/\tau'$. The level 3 shows the ionized state. Γ is the probability of the induction transition and may be expressed as $\Gamma=I\sigma/h\nu$. I designates the photon density and σ designates the absorption sectional area. For a while, the optical resonator is considered in connection with one set (equivalent to the case in which one laser rod 710 is used in FIG. 17) and expressed by abbreviating "'" which expresses the static system.

The rate equation is expressed as follows. Assuming the respective particle densities as $N_1$, $N_2$, $N_3$, then $$\frac{dN_1}{dt} = N_2\gamma_1 + (N_2 - N_1)\Gamma,$$

$$\frac{dN_2}{dt} = (\gamma_1 + \gamma_2)N_2 - (N_2 - N_1)\Gamma, \text{ and}$$

$$\frac{dN_3}{dt} = \gamma 2N2.$$

Since the natural radiation probability in this case is small compared to other cases and may be considered as $\gamma_2 \gg \gamma_1$, therefore $\gamma_1$ is omitted.

The rate equation can be solved with the initial conditions as $N_1 = N_1^0$, $N_2 = N_3 = 0$ at t=0, then with $\gamma = \gamma_2/2$, $\lambda_1 = \Gamma + \gamma + (\Gamma^2 + \gamma^2)^{1/2}$, and $\lambda_2 = \Gamma + \gamma - (\Gamma^2 + \gamma^2)^{1/2}$, $$N_1 = \frac{N_1^0}{2}\{\exp(-\lambda_1 t) + \exp(-\lambda_2 t)\} + \frac{N_1^0 \gamma}{2\sqrt{\Gamma^2 + \gamma^2}}[\exp(-\lambda_1 t) - \exp(-\lambda_2 t)],$$

$$N_2 = \frac{N_1^0 \gamma}{2\sqrt{\Gamma^2 + \gamma^2}}\{-\exp(-\lambda_1 t) + \exp(-\lambda_2 t)\}, \text{ and}$$

$$N_3 = N_1^0\left[1 + \frac{\Gamma\gamma}{\sqrt{\Gamma^2 + \gamma^2}}\left\{\frac{1}{\lambda_1}\exp(-\lambda_1 t) - \frac{1}{\lambda_2}\exp(-\lambda_2 t)\right\}\right].$$

Let us try to find the condition to satisfy $1-N_3/N_1^0$ (the beam loss rate)=$10^{-5}$. Assuming $\gamma \gg \Gamma$, since approximation is possible such as $\gamma_1=2\gamma$, $\gamma_2=\Gamma$, substituting $t'=L_1/\gamma\beta c\sim 0.21$ ns as t, then $1-N_3/N_1^0=\exp(-\Gamma t')=10^{-5}$, thus $\Gamma=5.48\times 10^{10}$ can be obtained.

Probability of Induction Transition Γ and Absorption Sectional Area

According to the description in page 32 of Quantum Electronics (First Volume), 1972 by edited by Koichi Shimoda, and Tatsuo Yajima, published by Shokabo, the probability of the induction transition Γ is expressed as $\Gamma = cn_\nu\sigma$ or $Ibg(\nu)/c$. Here, $n_\nu$ designates the photon density, I the photon energy flux, σ the absorption sectional area, and B the Einstein B factor. Namely, the following are expressed;

$$I = ch\nu n_\nu$$

$$\sigma = h\nu Bg(\nu)/c$$

$$B = (2\pi^2\mu^2)/(\epsilon_0 h^2)$$

μ designates the dipole moment of the atom which absorbs the light, h designates the Planck factor and ν designates the frequency of the photon. Furthermore, g(ν) represents the standardized absorption spectrum of atom ($\int g(\nu)d\nu=1$). The function g(ν) is the so-called shape function, which is available as the Lorentz type and the Gauss type. Respective types are expressed in the following equations with the $\nu_a$ being as the frequency of resonance;

$$g(\nu) = \frac{1}{\pi}\frac{\Delta\nu_a}{[(\nu-\nu_a)^2 + (\Delta\nu_a)^2]}, \text{ and}$$

$$g(\nu) = \frac{(\ln 2)^{1/2}}{\pi^{1/2}\Delta\nu_a}\exp\left[-(\ln 2)\frac{(\nu-\nu_a)^2}{(\Delta\nu_a)^2}\right].$$

Accordingly, if $\nu=\nu_a$ (or resonance has occurred), the maximum value is $g(\nu)=1/\pi\Delta\nu_a$ or $0.470/\Delta\nu_a$.

Spectrum Width $\Delta\nu_a$ $\Delta\nu_a$ is the width of the absorption spectrum. Let us consider the width of the absorption spectrum, because the value of the absorption sectional area is decided depending on this width. The width of the spectrum is widened uniformly or ununiformly. The latter widening or ununiform widening is caused in such a case as the aggregate of a multiplicity of spectrum lines appears as one extension of line due to, for instance, the relativistic Doppler effect, ununiform external magnetic field, the external electric field and the like. The beam that has been accelerated by an accelerator has an expansion of the energy. In this case, the width of the spectrum may be expressed as Gauss type. The former uniform expansion of the spectrum width is the one which can not be dissolved in principle. Since a normal state in terms of quantum mechanics of the atom does not continue infinitely, the life time of the atom changes with a definite life time. The life time of the atom excited to the level of the principal quantum number of 3 is considerably shortened by the Lorentz electric field as reported in JAERI-Research 97-057 and the width of the spectrum in this case may be expressed by the Lorentz type.

The Doppler expansion due to the thermal motion takes the form of the function of Gauss type with V being as its average velocity, therefore $\Delta v_a = 0.833 v_a V/c$. However, in the case of JAERI-Research 97-057, consideration should be made with regard to the width of the velocity distribution of $H^0$ beam that proceeds at a relativistic velocity.

Namely, $\Delta v'$ being the width of distribution of the velocity, it can be expressed as $\Delta v_a' = v_a' \Delta v'/c$, while the width of the distribution of the velocity in the laboratory system of the relativistic beam that has been accelerated is expressed as $\Delta v/v = \Delta p/\gamma^2 p$. By using the equation $\Delta v' = \gamma^2 \Delta v = v \Delta p/p$, in the system moving with the beam, $\Delta v_a'$ can be expressed as $$\Delta v_a' = v_a' \Delta v'/c = v_a' \Delta p \beta / p.$$

In the case of JAERI-Research 97-057, considering from the present design value, with about $\Delta p/p \sim 2 \times 10^{-3}$, the following equation can be considered;

$$\Delta v_a' = 1.84 \times 10^{-3} v_a' = 5.5 \times 10^{12}.$$

Width of Spectrum of Atom Having a Definite Life Time

In the case of JAERI-Research 97-057, since the life time is given as $\tau' = 1 \times 10^{-12}$ s, the Lorentz type is used as the absorption sectional area, its half value and half width $\Delta v_L'$ is expressed as follows;

$$\Delta v_L' = \frac{1}{2\pi\tau'} = 1.59 \times 10^{-11} \text{ s}^{-1}.$$

The spectrum width according to the Doppler expansion and the spectrum width of a definite life are approximated to the spectrum width as follows by synthesizing them.

$$\Delta v' = (\Delta v_a'^2 + \Delta v_L'^2)^{1/2} = 5.5 \times 10^{12}.$$

Therefore, the absorption sectional area may be obtained as follows by using Gauss type;

$$\sigma = h v_g' B (\ln 2/\pi)^{1/2} / c \Delta v' = 0.00208 (\ln 2/\pi)^{1/2} / \Delta v' = 1.74 \times 10^{-16} \text{ cm}^2.$$

(see, Study on Nuclear Fusion by Tsutomu Ishimura, Vol. 3, Separate Vol. 2, 1974, Plasma Research Institute of Nagoya University, Gathering for Discussion about Nuclear Fusion, page 83).

The induction transition rate $\Gamma = c n_v \sigma = 5.48 \times 10^{10}$ is obtained. If $\sigma = 1.74 \times 10^{-16}$ cm$^2$, the necessary photon density is $$n_v = 1.05 \times 10^{16} \text{ cm}^2.$$

Photon Density at Optical Resonator

Assuming that the laser output is $I_0$ W, the photon density is $n_{vo}$, $\lambda$ is the wave length of the laser and the sectional area is S cm$^2$, then $$I_0 = n_{vo} h v c S = n_{vo} h c^2 S / \lambda,$$

then $$n_{vo} = \lambda I_0 / c^2 h S,$$

where h designates Planck's constant. Furthermore, assuming that $S = 10^{-4}$ m$^2$, then $$n_{vo} = 1.68 \times 10^5 \lambda I_0 \text{ cm}^{-3},$$

where $\lambda$ designates the wave length of the laser (nm).

Use of such an optical resonator as the one shown in FIG. 17 makes it possible to increase the photon density by storing the light. By using Q value of the optical resonator, the increase rate of the photon density is obtained as $n_v/n_{vo} = \lambda Q/2\pi L$. On the other hand, since $Q = 4\pi L/\lambda(1-R_1 R_2)$, the increase rate of the photon density by the optical resonator is $$n_v/n_{vo} = 2/(1 - R_1 R_2),$$

where L designates the distance between the mirrors and $R_1$ and $R_2$ designate the reflection ratio.

The loss at the optical resonator is considered to be not only due to the loss at the mirrors but also the diffraction loss, the coupling loss, the absorption by the media and scattering. The loss rate may also be varied depending on the wave length and the mode of the light. Assume here, however that the loss at the mirrors is large, and the absorption by the media is small (in fact, the energy absorbed by excitation of $H^0$ beam is extremely small). Assume here that $n_v/n_{vo} = 200$ for simplicity. In other words, $R_1$, $R_2 = 0.995$ which is the value of extremity are applied.

Accordingly, the relationship between the laser output and the density of the photon accumulated in the optical resonator is, $$n_v = 3.4 \times 10^7 \lambda I_0 \text{ cm}^{-3}.$$

According to the laboratory system, assuming $\lambda = 453$ nm, $n_v' = n_v'/\lambda$, $n_v' = 1.05 \times 10^6$ cm$^{-3}$, the necessary laser output is $$I_0 = 270 \text{ kW}.$$

Accordingly, the laser beam having the pulse 270 kW (48 kW is average if the duty is considered to be 0.18) may be used. It has to be taken into consideration that the amount of this laser beam is the amount generated in the laser and not the amount to be taken out of the optical resonator as the laser beam.

It has furthermore to be noted that this laser output has been decided as the condition to attain the beam loss rate (not the beam spill rate) of $10^{-5}$ which is attained within a short period of time and with a short distance of the interaction. If the beam loss rate is $10^{-4}$, the average laser output is 38.4 kW and if the beam loss rate is $10^{-3}$, then the average laser output will be 28.8 kW. It is to be noted that since two sets of the optical resonators are provided as shown in FIG. 17, the laser output of one set is half of those figures as above.

4. Summary

As explained above, in the neutralizer, the beam in the $H^-$ beam state is converged in the quadrupole electromagnet and then passed through the wiggler magnetic field for neutralization. Since the length of the magnetic field has been kept at 0.015 m, the deflection angle may be less than 1 mrad. The neutralized beam is allowed to proceed straightforwardly without being influenced by the bending caused by the magnetic field and directed to the ionizer provided at the linear section of the ring. It is necessary to so set the intensity of the deflection electromagnet part of the ring as to avoid ionization of $H^0$ beam. Provision of the beam transport leading to the beam dump at the peripheral region of the deflection electromagnet part is necessary not for prevention of the beam loss but for adjusting test for the beam. By converging the beam at the central part of the ionizer, it will be possible to implement effective use of the photon beam.

The ionizer applies the ionization method by use of the wiggler magnetic field and the photon beam accumulated in the optical resonator, or an ionization method which is a combination of the Lorentz electric field by the wiggler magnetic field and the resonance excitation method by the light owing to the optical resonator.

In the charge-exchange method by use of a wiggler magnetic field, the magnetic field of 1 T and the distance of interaction of 1.5 cm long are required. For preparing such a magnetic field, the undulation method by use of a permanent magnet to be used in a radiation facility or an electromagnet method are simple and easy to use. A mechanism for adjusting the gap between the pole pieces which are oppositely facing with each other and the countermeasures for vacuum, etc. are necessary. Particularly, it is technically difficult to localize the wiggler magnetic field to the distance of 1.5 cm. The length (5 cm) in the order of the radius of the drift tube is necessary for $L_1$. In this case, in the neutralizer, neutralization is all finished in the forward part of 1.5 cm in the central magnetic field. In the ionizer, ionization is executed at the rearward part of the central magnetic field by interaction with the light. The distance of $L_2$ may be utilized for sharp cutting of the magnetic field. In JAERI-Research 97-057, evaluation of the edge effect of the magnetic pole is omitted. Therefore, detailed consideration is necessary at the time of manufacturing.

It is further to be understood that use of relativistic Doppler effect and an optical resonator mitigates the load over the laser output. By using the resonance excitation method to efficiently excite the neutral atom in the ground state to the level of n=3, the load over the laser is said to be mitigated. Since the absorption sectional area for the resonance excitation is largely dependent on the width distribution of the velocity of the $H^0$ beam that has been accelerated, if the width distribution of the velocity of the $H^0$ beam may be made smaller, the laser output may correspondingly be mitigated.

In summary of what has been described so far, use of the wiggler magnetic field and photon makes it possible to make the deflection angle of the beam small and largely reduce the adverse influence, such as scattering of the circulating ion and the like, thus contributing much to reduction of radio activation. However, this will result in the necessity to implement a new technical means of accurate tuning of the laser beam and adjustment of a wiggler magnetic field.

In any case, the resonance ionization method by a novel accelerator beam which including a resonance excitation and a wiggler magnetic field and applicability of the process of one wave length-one stage in the so-called visible light range are expected to open a new way of efficient application of laser in the injection of the beam of long pulse such as super-conducting accelerator.

D. Embodiments of the Invention

The embodiment of the present invention is the improvement of the device disclosed in JAERI-Research 97-040, 97-041 and 97-057 in that the laser output has been considerably reduced with respect of the ionizer for the injection device.

According to the embodiment of the present invention, the ionizer for the injection device consists of an undulator provided at the linear section of the ring and an optical resonator and is adapted to ionize $H^0$. $H^0$ beam that has been excited by the relativistic Doppler effect and the resonance absorption of the laser beam is efficiently ionized in the Lorentz electric field caused by the interaction of the relativistic velocity of the injected particles and the magnetic field. The Lorentz electric field by the undulator magnetic field is capable of remarkably increasing the efficiency of the charge-exchange of the excited hydrogen and ionizing it with the dye laser of about 485 nm, less than 1 kW. There is no scattering due to foils nor any influence over the circulating ions, both of which were caused in the prior art. The present device, therefore, is capable of avoiding beam spill at the injection device for the proton storage ring and very effective in reducing radio activation.

A part of the following description may be overlapped with the descriptions Sections A through C which have been already described, but it will be repeated for easy understanding.

1. Preface

As mentioned in the Field of the Invention, since the injection device for the proton storage ring for the scientific research plan of neutron of the Japan Atomic Energy Research Institute is adapted to inject the proton beam of a large output that has not been realized before, all possible measures have to be taken against leakage of beam at the injection part and low radio activation. For this reason, plans of a similar scale being implemented in EU and USA, which depends on the conventional foil method, employ two sets of rings so as to attain dispersion of the radiation part. In this connection, if a concept of using only one ring is applied, the injection method of a novel concept which makes it possible to reduce radiation must be developed. In order to employ a super-conducting linear accelerator and take advantage of the use of acceleration of long pulses as in the present plan, a novel measure allowing multi-turn injection to be realized must absolutely be studied.

The method which substitutes with the charge-exchange method by use of foils according to a prior art, a novel injection device with a low radio activation which uses a magnetic field and a light is described in JAERI-Research 97-040, 97-041 and 97-057. More specifically, this is the method of electron desorption (neutralization) or ionization by causing the hydrogen ($H^-$, $H^0$) beam having a relativistic velocity to pass through a wiggler magnetic field and effect an electron desorption (or neutralize) or ionize the beam by a Lorentz electric field (E=v×B) generated during such passage of the beam. According to JAERI-Research 97-057, at this time, the photon beam is used for exciting $H^0$ in the ground state to the level of the principal quantum number n=3, and used for supplementing the shortage of the Lorentz electric field.

Furthermore, according to JAERI-Research 97-057, the following equation was obtained with w being as the beam loss rate (non-ionization rate), $$\exp(-\Gamma t')=w,$$

or $$-\Gamma t'=\ln(w),$$

where 1 n designates natural logarithm, $\Gamma$ designates the induction transition probability for exciting $H^0$ beam and proportional to the laser output, t' designates the time in which $H^0$ beam interacts with the laser beam and the wiggler magnetic field, and ' designates the amount in the system moving with $H^0$ beam.

Further, according to JAERI-Research 97-057, the solution is directed to make small the beam deflection angle in the wiggler magnetic field and shorten the range of presence of the magnetic field (to make t' small) in order to attain the most important main object, or low radio activation or reduce the radio activation due to the beam spill. However, this requires a large $\Gamma$, resulting in increase of the laser output, which makes the study on practical usage rather difficult. As it can be seen from the above-mentioned equation, this suggest that $\Gamma t'$ factor has such an extremely great effect as decides the order (level) of the beam loss. This has provided a clue to a new development.

The embodiment of the present invention, based on these new knowledge, has led to a method of utilizing these new knowledge to the maximum extent so that certain rationalization and optimization have been suggested for reducing the laser output.

The storage ring for scattering of neutron is adapted to receive $H^-$ beam of 1.5 GeV ($\beta$=0.92) with the peak of 30 mA for a period of 3.6 ms and enter and store it in the ring. In the ring, the diameter of this beam is expanded to 15 cm so as to store the same by reducing the space charge effect. Subsequently, it will be compressed to a beam in the order of 0.5 $\mu$s. The beam is then fed out to the target which will be the neutron sources as the pulse of 50 Hz with the peak of 100 A.

The injection device according to the embodiment of the present invention is, similarly to the one disclosed in JAERI-Research 97-057 (FIG. 14), consisted of two step configuration comprising a neutralizer adapted to converge $H^-$ beam and neutralize the same before it enters the ring and an ionizer placed at the linear part of the ring and adapted to ionize $H^0$ beam, both of which being arranged on a straight line. Of these components, the neutralizer is adapted to cause $H^-$ beam to pass through the cyclic wiggler magnetic field and desorb its electron (ionize) to neutralize the same. The neutralized $H^0$ is caused to proceed straightforwardly to enter the ionizer installed at the linear part of the ring. In the ionizer, the $H^0$ beam is caused to collide against the photon beam and absorb it to be excited. Further, at the same time, the $H^0$ beam is ionized by means of the Lorentz electric field in the wiggler magnetic field. This makes it possible to ionize the $H^0$ beam and put it on the trajectory of the ring. The $H^0$ beam which has not been ionized is caused to proceed straightforwardly and enter the beam dump.

The present invention is, following this method, intended to make particularly the wiggler magnetic field for ionization of the ionizer and the laser optical system more efficient and optimized.

Here, the relevant terminology is defined. $H^0$ beam intensity ($I_i$, the initial value $I_{i0}$), and the intensity of the beam which is now $H^+$ due to the charge-exchange is $I_c=I_{i0}-I_i$. Since $I_i/I_{i0}$ means the rate of the non-charge-exchange, the $I_i/I_{i0}$ is defined to be the non-ionization ratio. Since $I_c/I_{i0}$ means the rate of the charge-exchange, it is defined to be the ionization ratio. $I_c$ is classified into two categories, i.e. the one ($I_s$) in which the deflection angle due to the charge-exchange is larger than a certain limit value $\psi_{max}$, and another ($I_g$) in which the deflection angle is smaller than the limit value. In other words, $I_c=I_s+I_g$. $I_g/I_{i0}$ is defined to be the injection exchange rate and $I_s/I_{i0}$ is defined to be the beam spill rate. Namely, the beam of which charge has been exchanged but the deflection angle is large is defined to be the beam spill rate. The configuration of a low radio activation injection device for reducing this value will now be explained.

In accordance with development of the design of the ring type injection device which has been made subsequently, the following four design conditions are applied for optimization of the injection device.

The first design condition is to make the diameter of the drift tube of the ring type injection device large. This will cause the vessel wall to be subject to radio activation. The deflection angle of the $H^+$ beam generated at the time of the charge-exchange is kept less than $\psi_{max}=\pm 4$ mrad (4 cm for 10 m). In the area adjacent to the axis of the drift tube, the ionization is effected.

The second condition is to provide an undulator magnetic field in place of the wiggler magnetic field and the distance between the magnetic poles of the undulator is decided to be 20 cm corresponding to the diameter of the large drift tube. Accordingly, the periodic length is also made several times longer. Keeping the magnetic field weak in order to increase t' as above mentioned, an undulator having a number of repeating waves is provided.

The third design condition is to adopt the resonance excitation method (97.216 nm) by increasing to the principal quantum number n=4 by means of photon beams in order to ionize at the weak undulator magnetic field. Since this wave length will be about 485 nm due to the relativistic Doppler effect, YAG+Dye Laser method having a variable wave length is considered as the necessary laser.

The fourth condition is to keep the beam spill rate lower than $10^{-5}$. The particles which may become the loss without being exchanged of the charge for any reason will be conducted to the beam dump, whereby the radio activation on the vessel wall or the like may be reduced to the extremity.

Optimum configuration of the device satisfying the four conditions as described above will now be explained.

2. Ionizer

Figure 19A:
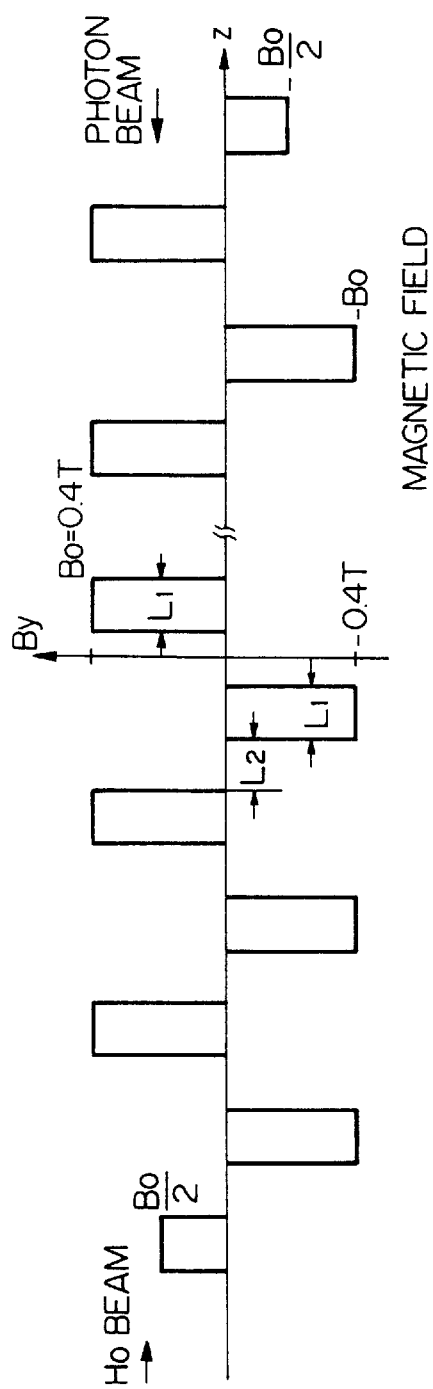
FIG. 19a is a part of the drawing illustrating the magnetic field disposition for charge-exchange (undulator magnetic field) of an ionizer according to a preferred embodiment of the present invention and its action and illustrates the distribution of magnetic field.
Figure 19B:
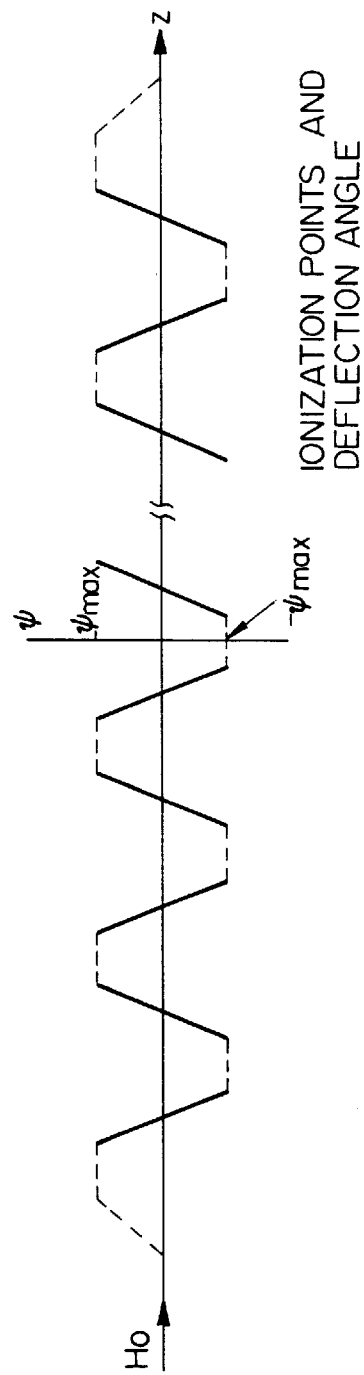

The configuration of the magnetic fields for charge-exchange (the undulator magnetic field) is so arranged as shown in FIG. 19a and FIG. 19b. The distribution of the magnetic field and the terminology are defined in FIG. 19a. The distribution and the length of the magnetic field are assumed to be rectangular for ease of integration as shown. But, it is to be noted that the sharpened ends have no special meaning. Assume that the intensity of the magnetic field is $B_0$, the length (to be called as the length of the magnetic field) is $L_1$, and the magnetic field alternately changes the direction of magnetization to provide the so-called undulator magnetic field. The portions designated by $L_2$ are provided as the location having no magnetic field (or the free space). It is also assumed that the distribution of the magnetic field is so arranged that the charged beam passing through the entire zone will not be subjected to the deflection angle. Those beams which have entered this undulator magnetic field and charge-exchanged on the way are given the deflection angle at the points (z) of the charge-exchange. For example, $H^0$ beam that has entered the magnetic field as illustrated in FIG. 19b will not be subjected to the magnetic force at the inlet, but will be subjected to the magnetic force later after it will have been ionized. Namely from the equation of motion:

$$mp\gamma \frac{dv_x}{dt} = ev_z x B_y, \text{ and}$$

$$\psi = \frac{v_x}{v_z} = \frac{v_x}{c\beta} = \frac{e\int v_z B_y dt}{m_p \gamma c\beta} = \frac{e}{m_p \gamma c\beta} \int B_y dz,$$

where $v_x$ designates the variation of the velocity caused by the magnetic field and constitutes the velocity component orthogonal to the beam. The area for integration is from the point of ionization (z point) up to the outlet. Namely, the left side of the above-mentioned equation means the beam deflection angle as the function of the point of ionization (the point after which no magnetic force is applied), and the maximum value is $\psi_{max}=eB_0L_1/m_p\gamma c\beta$. The deflection angle of the beam that has passed through the entire magnetic field in the ionized state is zero. It is to be understood that if $K=eB_0L_1/m_pc\beta$ equivalent to the undulator parameter which is used for free electron laser or development of radiation light is applied, then $\psi_{max}=K/2\gamma$. This is because the tapered undulator is provided for the factor ½.

Furthermore, as described in JAERI-Research 97-057, (see the Section C), the displacement in the x direction is obtained as $x=\int v_x dt = \int \psi dz$. Then, $x_{max}=\psi_{max}(L_1+L_2)$, and $L_2$ is used for adjustment of $x_{max}$, but it is negligible small in the case of the embodiment of the present invention.

In order to attain $\psi_{max}=4$ mrad from $K=eB_0L_1/m_pc\beta = 0.347B_0L1$, then $B_0L_1=0.06$. Accordingly, the distance between the magnetic poles of the undulator is 20 cm, and thus it is difficult to provide a short cyclic length. Therefore, the cyclic length of the undulator is decided here as 50 cm, and $L_1=0.15$ m. By doing so, $L_2=0.10$ m and $B_0=0.4$ T. On the other hand, from the design point of view of the ring, a space of 7.5 m sandwiched by the electromagnet for convergence may be spared at the linear part of the ring, an undulator having the entire length of 7 m may be installed there by leaving the forward and rearward areas of said space as the space for the tapered magnet. Therefore, assuming M as the number of periods, then M at the linear part of the ring is M=14, or 28 half periods. The time required for passing through this part is $2.54 \times 10^{-8}$ s and in case of the system (the static system) moving with $H^0$ of 1.5 GeV($\beta=0.92$, $\gamma=2.60$), $t'=t/\gamma=0.98 \times 10^{-8}$ s.

Undulator Magnetic Field and Photon Beam

Assume that $H^0$ beam that has been neutralized in the neutralizer is passed through the undulator magnetic field as the beam having the sectional area of 1 $cm^{-2}$. This is possible if the deflection angle in the wiggler magnetic field of the neutralizer is kept within ±0.5 mrad (see JAERI-Research 97-041). (In this case, a movable mechanism capable of narrowing the distance between the magnetic poles of the wiggler magnetic field must be installed.) Assume also that the photon beam is caused to collide against $H^0$ beam having also the sectional area of 1 $cm^2$ in the undulator magnetic field right from the front of the $H^0$ beam. In other words, $H^0$ beam is excited by using photons and at the same time ionized by the Lorentz electric field generated by the interaction with the magnetic field. As viewed in FIG. 19a, the ionized beam is subjected to a deflection angle at the point z of ionization, the deflection angle being $\psi_{max}=4$ mrad as explained earlier, or the beam spill rate being zero.

In case of the static system, the time of interaction with the photon corresponds to the time of passage through the undulator magnetic field, or $t'=L_1/\gamma\beta c \sim 0.21$ ns. In order to efficiently ionize the $H^0$ beam in the ground state that has entered the magnetic field of 0.4 T within this period of time, the beam has to be excited to the principal quantum number of n=4. This is because since the ionization transition probability of $H^0$ beam having the principal quantum number of n=4 at the magnetic field of 0.4 T is less than $\tau'=1 \times 10^{-11}$ s, as shown in FIG. 5, that is, extremely short, it may be excited and ionized instantly. In other words, if such an intense beam necessary for exciting $H^0$ beam to the principal quantum number n=4 is available, then by the Lorentz electric field in the magnetic field of $B_0=0.4$ T, ionization may be sufficiently executed.

Wave Length of Photon for Excitation

In order to carry out excitation efficiently by means of photon beam, direct collision with laser beam is not appropriate, and thus it is necessary to implement high efficiency in such manners as amplification of the photon density by use of an optical resonator, increase of the absorption sectional area by adoption of the resonance excitation method and so forth. This will be explained by referring to the configuration illustrated in FIG. 20.

Figure 20:
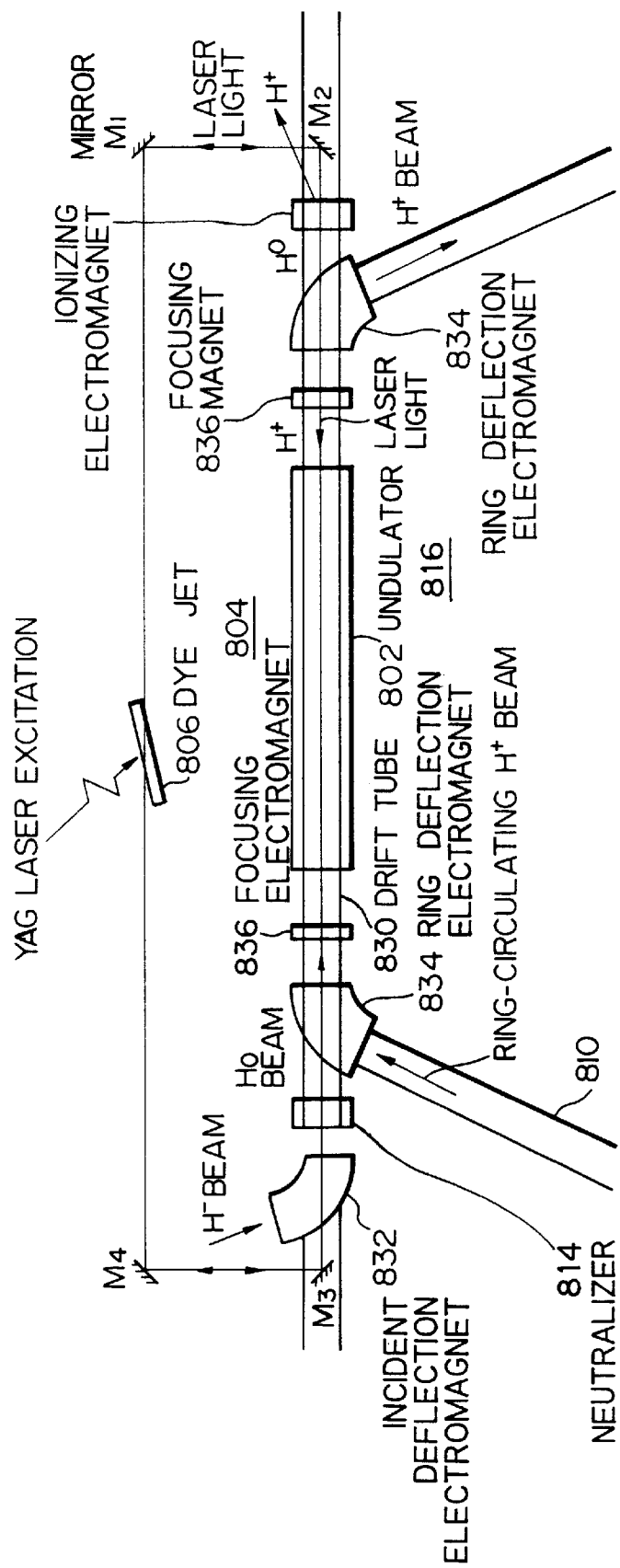
FIG. 20 schematically illustrates the basic configuration of an ionizer according to a preferred embodiment of the present invention as assembled in a storage ring and an injector.

FIG. 20 schematically illustrates the basic configuration of the ionizer according to an embodiment of the present invention in an assembled condition into the storage ring and the injection device. As illustrated in FIG. 20, the ionizer 816 includes an undulator 802 and a ring type optical resonator 804. The optical resonator 804 comprises a dye jet 806 which is excited by YAG laser beam from the laser beam source (not shown) to generate a laser beam having a wave length different from that of the YAG laser beam, and mirrors $M_1$, $M_2$, $M_3$ and $M_4$ which circulate the laser beams which have been generated bidirectionally by the dye jet 806 and resonate them to amplify the photon density. The mirrors $M_2$ and $M_3$ are provided in a drift tube 830 through which $H^0$ beam proceeds. Since the mirrors $M_2$ and $M_3$ are arranged along the straight line, $H^-$ beam from the accelerator has to be injected obliquely. An incident deflection electromagnet 832 is provided in front of the neutralizer 814 for the purpose of directing the $H^-$ beam that has been injected obliquely to the drift tube 830. A ring deflection electromagnet 834 is intended to deflect $H^+$ beam so as to allow it to circulate in a storage ring 810, while an electromagnet for convergence 836 is intended to converge the $H^+$ beam which will circulate in the storage ring 810. The electromagnet for ionization 838 is intended to ionize and deflect such $H^0$ which has not been ionized in the undulator 802 and dump it in a manner that it may not collide against the mirror $M_2$. It should be understood that according to the present invention, the laser beam to be used is not limited to YAG laser and the optical resonator to be used is not limited to the optical resonator 804 shown in FIG. 20, but that $H^0$ may be excited by resonance to a desired principal quantum number by means of the laser beam of which photon density has been amplified by the optical resonator and no types of the laser generation sources and the optical resonators are limited.

The light required for exciting $H^0$ in the ground state to the level of the quantum number of n=4 is the light of the well-known $L_\gamma$ beam of well-known Lyman series having a wave length of $\lambda'$=97.216 nm, provided that this wave length is the value of the system moving with $H^0$ beam.

Let us firstly determine the wave length of the laser beam. The ring type optical resonator 804 as shown in FIG. 20 is provided for passing the laser beam having a sectional area of 1 cm² through the undulator magnetic field. If the laser beam is caused to collide against $H^0$ right from the front, the light having a wave length of 97.216 nm ($\lambda'$) is changed to the light of $\lambda=\lambda'\gamma(1+\beta)$ by the relativistic Doppler effect, whereby the wave length will be $\lambda$=485.30 nm. In the meantime, although the optical resonator shown in this drawing requires such optical elements as a mirror(s) or a lens(es) for increasing the diameter of the photon beam to a certain extent, these optical elements are not shown here. Since the mirror $M_2$ to be placed at the beam dump may be subject to radio activation due to the $H^0$ beam, even slight, that has emerged without being ionized, any countermeasure should be taken, for the purpose of maintenance, to make the mirror $M_2$ a movable type or provide a strong ionization electromagnet 838 (for which no deflection angle may not be considered) in front of the mirror $M_2$.

Photon Density in the Optical Resonator

Assume that the laser output is $I_0$W, the photon density is $n_{v0}$, the wave length of the laser beam is $\lambda$, and the sectional area is S cm², then $$I_0 = n_{v0} h \nu c S = n_{v0} h c^2 S/\lambda,$$

then, $$n_{v0} = \lambda I_0/c^2 h S,$$

where h is the Planck's constant. Assume furthermore that $S=10^{-4}$ m², then $n_{v0}=1.68\times10^5 \lambda I_0$ cm⁻³,
where $\lambda$ is the wave length of the laser beam (nm).

The density of the photon energy inside the optical resonator 804 is increased to such an extent as the output of the laser is balanced with the loss of the laser there. In other words, use of an optical resonator of which loss is small, makes it possible for the density of the photon energy to be enhanced with a slight amount of the laser output. By using Q value of the optical resonator 804, $n_v/n_{v0}=\lambda Q/2\pi L$ can be obtained as the multiplication factor. On the other hand, since $Q=4\pi L/\lambda(1-R_1R_2R_3R_4)$, then the increase rate of the photon density of optical resonator 804 is $$n_v/n_{v0}=2/(1-R_1R_2R_3R_4),$$

where L is the distance between the mirrors $M_1$ and $M_4$ ($M_2$ and $M_3$), and $R_1$, $R_2$, $R_3$ and $R_4$ are the reflection ratio, which can be obtained to the level of 0.999 if a multi-layer construction is applied.

The loss of the resonator can include not only the loss of the mirrors but also refraction loss, coupling loss, absorption and scattering of media, and so forth. They are variable depending on the wave length and the mode of the light. For facilitating understanding, it is assumed here that the loss by the mirror is large and absorption by the media is small (in fact, then energy absorbed by excitation of $H^0$ beam is extremely small). For simplicity of explanation, $n_v/n_{v0}=200$, or an ample value in the technical sense such as $R_1R_2R_3R_4=0.99$ is applied.

Accordingly, the relationship between the laser output and the density of the photon accumulated in the optical resonator is $$n_v = 3.4 \times 10^7 \lambda I_0 \text{ cm}^{-3}.$$

Furthermore, if it is converted to the static system, due to the Lorentz contraction, $$n_v' = \gamma n_v = 8.84 \times 10^7 \lambda I_0 \text{ cm}^{-3}.$$

3. Ionization Process

Figure 21:
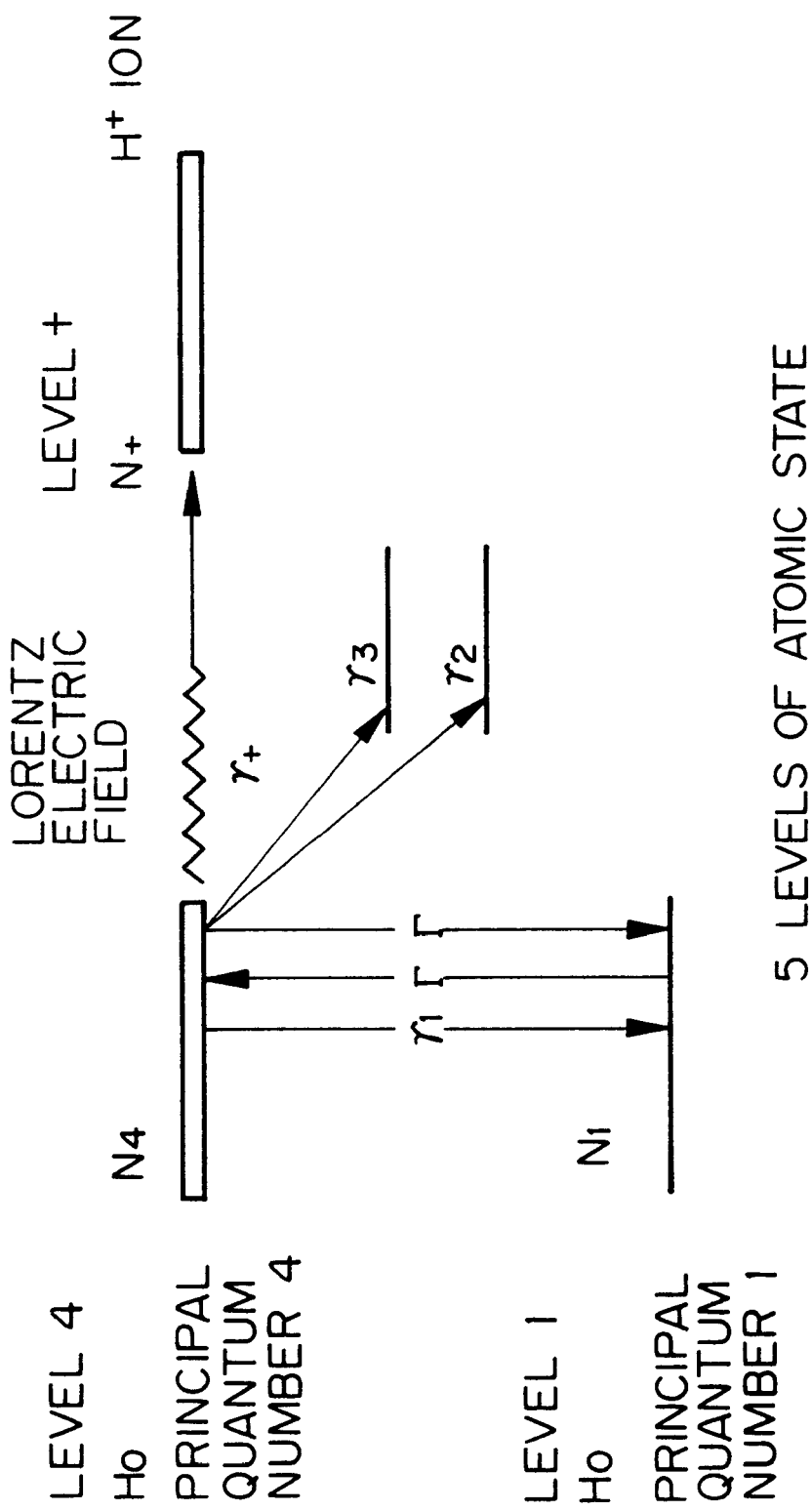
FIG. 21 illustrates different levels of atomic state for explaining the ionization process in the embodiment of the present invention.

Let us consider five levels of atomic states shown in FIG. 21. Assume here that $\gamma_1$, $\gamma_2$, $\gamma_3$ designate respectively the probabilities of natural radiation from the level 4 (the principal quantum number being 4 and the density being $N_4$) to the level 1 (the ground state), the level 2 and level 3. $\gamma_+$ is the probability of the atom in the level 4 being ionized, and $\tau'$ is the life time in the magnetic field, then $\gamma_+=1/\tau'$. The level + designates the ionized state (the density being $N_+$). $\Gamma$ is the induction transition rate and expressed as $\Gamma=cn_v\sigma$, where $\sigma$ is the absorption sectional area. The expression is made by omitting "'" representing the static system for a following while. Furthermore, since $\gamma_2$ and $\gamma_3$ are small compared to $\gamma_+$, these are neglected and substantially three levels of atomic state are taken in account.

Assuming the density of the photon is $N_1$, $N_4$, $N_+$ respectively, $$\frac{dN_1}{dt} = \gamma_1 N_4 + (N_4 - N_1)\Gamma,$$

$$\frac{dN_4}{dt} = -(\gamma_1 + \gamma_+)N_4 - (N_4 - N_1)\Gamma, \text{ and}$$

$$\frac{dN_+}{dt} = \gamma_+ N_4.$$

Furthermore, the probability of natural radiation in this instance is considered to be small compared to other cases, and $\gamma_+ \gg \gamma_1$ may be considered, then $\gamma_1$ is also omitted.

Figure 22A:
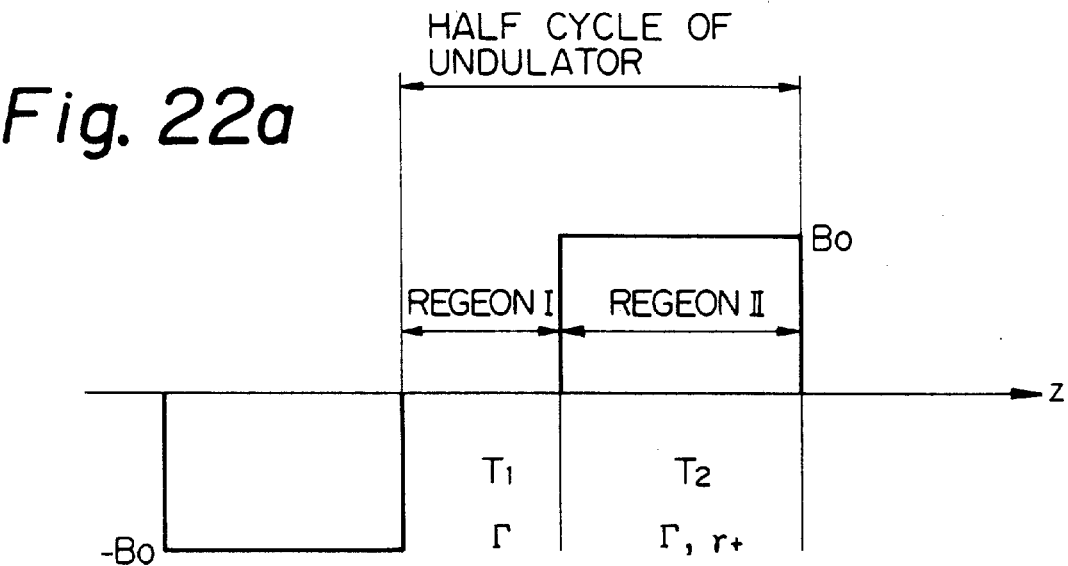
FIG. 22a is a part of the drawing for explaining the ionization process in the embodiment of the present invention and illustrates the relation between the half cycle of the undulator and the regions I and II.
Figure 22B:
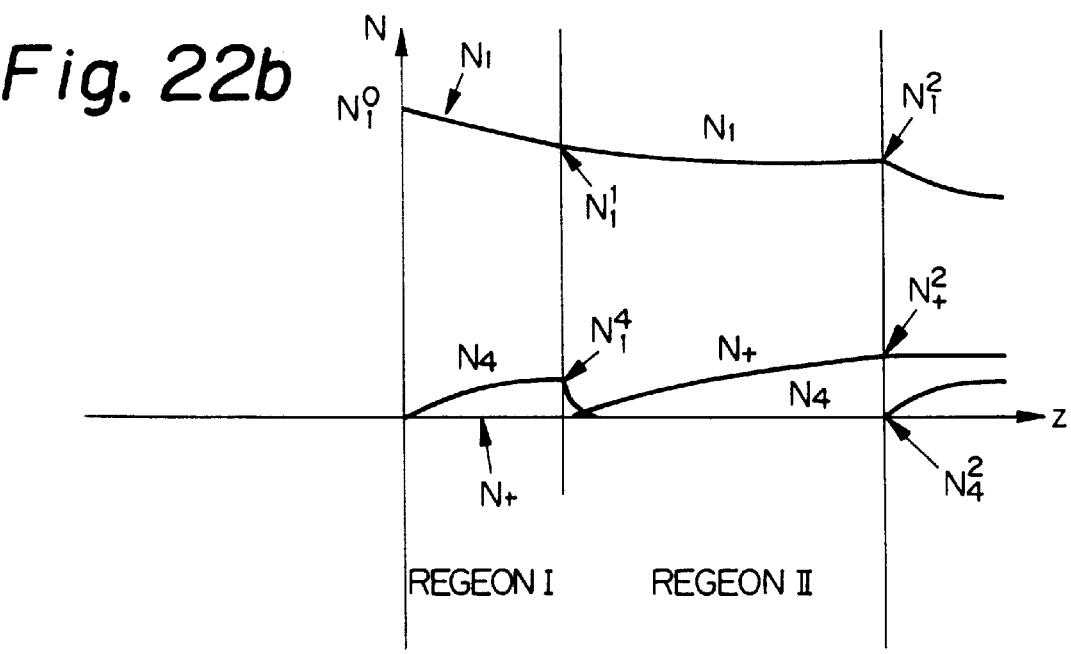
FIG. 22b is a part of the drawing for explaining the ionization process in the embodiment of the present invention and paradigmatically illustrates the rate equation.

This rate equation is solved in two regions as shown in FIG. 22a and FIG. 22b. As shown in FIG. 22a, the region I designates the space in the magnetic field 0, while the region II designates the space of the magnetic field of $B_0$. Assume that the initial condition of the region I is $N_1=N_1^0$ and $N_4=N_+=0$ at t=0, since $\gamma_+=0$, the values at $t=T_1$ are respectively as follows;

$$N_1^1 = N_1^0(1+\exp(-2\Gamma T_1))/2,$$

$$N_4^1 = N_1^0(1-\exp(-2\Gamma T_1))/2,$$

and $$N_+^1 = 0.$$

The solution of the region II is, if $\gamma=\gamma_+/2$, expressed as the exponential function having the decay time constant being respectively $\lambda_0=0$, $\lambda_1=\Gamma+\gamma+(\Gamma^2+\gamma^2)^{1/2}$, and $\lambda_2=\Gamma+\gamma-(\Gamma^2+\gamma^2)^{1/2}$. It can also be solved with the initial condition being $N_1=N_1^1$, $N_4=N_4^1$, $N_+=0$ at $t=T_1$. The values after the lapse of the time $T_2$ are as follows;

$$N_1{}^2=(N_1{}^1+\Gamma N_4{}^1/\gamma_+)\exp(-\lambda_2 T_2),$$

$$N_4{}^2=(\Gamma N_1{}^1/\gamma_+)\exp(-\lambda_2 T_2),$$

and $$N_+{}^2=N_1{}^0-(N_1{}^1+\Gamma N_4{}^1/\gamma_+ \Gamma N_1{}^1/\gamma_+)\exp(-\lambda_2 T_2),$$

where $\exp(-\lambda_2 T_2)$ is approximated as $\exp(-\lambda_2 T_2)\to 0$.

Furthermore, if $\Gamma/\gamma_+$ is approximated as $\Gamma/\gamma_+\to 0$, $\lambda_1=\gamma_+$, and $\lambda_2=\Gamma$ may be considered, the following equations will finally be obtained;

$$N_1{}^2=N_1{}^1\exp(-\lambda_2 T_2)=(N_1{}^0/2)(1+\exp(-2\Gamma T_1))\exp(-\Gamma T_2),$$

$$N_4{}^2=0,$$

and $$N_+{}^2=N_1{}^0-N_1{}^1\exp(-\lambda_2 T_2)=N_1{}^0-(N_1{}^0/2)(1+\exp(-2\Gamma T_1))\exp(-\Gamma T_2).$$

As it can be seen from these equations, $N_1{}^0-N_1{}^2=N_+{}^2$ and the amount of $H^0$ ionized in this region is equivalent to the amount of the injected $H^0$ beam which is lowered due to the injected $H^0$ beam in the ground state having been excited.

Conversely speaking, the rate of the injected $H^0$ beam in the ground state which is not ionized while passing through the half cycle of the undulator and remains as it was, that is, the rate of non-ionization is $$N_1{}^2/N_1{}^0=(1+\exp(-2\Gamma T_1))\exp(-\Gamma T_2)/2=\cosh(\Gamma T_1)\exp(-\Gamma T),$$

where $T=T_1+T_2$.

Accordingly, the rate of non-ionization after passage of the ion through the entire undulator is $$I_i/I_{i0}=\cosh^{(2M)}(\Gamma T_1)\exp(-2M\Gamma T).$$

Let us obtain the condition which will lead to (the rate of non-ionization)=$10^{-5}$. As the first approximation, assume that $\cosh(\Gamma T1)=1$ and $2MT=t'=t/\gamma=0.98\times10-8$ s, $\Gamma=51$ n10/t'=$1.17\times10^9$.

Substituting $T_1$=0.14 ns (static system), $\cosh(\Gamma T_1)$=1.013 may be obtained. Using this value, the approximation is made more precise and finally the following equation may be obtained;

$$\Gamma=1.33\times10^9 \text{ s}^{-1}.$$

Induction Transition Probability $\Gamma$ and Absorption Sectional Area

As described in JAERI-Research 97-057, the induction transition probability is expressed as $\Gamma=cn_v\sigma$ or $IB_g(v)/c$. Here, $n_v$ designates the photon density, I designates the photon energy flux, $\sigma$ designates the absorption sectional area, B designates Einstein's B factor and g(v) designates the form function.

Furthermore, it is to be noted that the form function which determines the absorption sectional area of the resonance excitation is decided depending on the life time of an atom or the absorption spectrum width due to the Doppler expansion. In the case of the embodiment of the present invention, the form function is decided by the width of the Doppler expansion and the following spectrum width may be considered with the velocity expansion of the $H^0$ beam being half width $\Delta p/p$=1/1000;

$$\Delta v'=v'\beta\Delta p/p=2.84\times10^{12}.$$

Accordingly, by using the form function of Gauss type, the absorption sectional area is $$\sigma=2(\ln 2/\pi)^{1/2}hv'B/c\Delta v'=0.000771\times 2(\ln 2/\pi)^{1/2}/\Delta v'=2.55\times 10^{-16} \text{ cm}^{-2}$$

(see Tsutomu Ishimura, Study on Nuclear Fusion, Vol. 32, Supplementary Volume 2, 1974, Nagoya University, Plasma Research Institute, Gathering for Discussion about Nuclear Fusion, P. 83, and Laser Society: Handbook, 1982 published by Ohm, p 259).

From the required induction transition probability $\Gamma=cn_v\sigma'=1.33\times10^9$ and the relative equation between the laser output and the photon density $n_v'=8.84\times10^7\lambda I_0$ cm$^{-3}$, $I_0$=4.07 kW.

This is the amount which may be attainable with a little more effort and can be attained by use of the pulse of 4.07 kW (the average 732 W, considering that the duty is 0.18). However, it is to be noted that this laser output is not the amount of the laser beam to be taken out of the optical resonator but the amount of the laser beam to be generated in the laser resonator. Namely, the laser corresponds to 73 W, if compared to a laser device having a normal output reflection mirror having a transmission rate of 0.1.

It is furthermore to be noted that this laser output has been decided as the condition to make the rate of the non-ionization (not beam spill rate) as $10^{-5}$. If it is $10^{-4}$, the laser output will be ⅘ of that in the case of $10^{-5}$, and if it is $10^{-3}$, the laser output will be ⅗ of that in the case of $10^{-5}$.

4. Summary

As an embodiment of the present invention for attempting a further reduction of the laser output, there has been explained an ionizer which uses a method by use of an undulator magnetic field and photon beam stored in the optical resonator, or an ionization method consists of a combination of Lorentz electric field by provided an undulator magnetic field and the method of resonance excitation by use of the light provided by the optical resonator.

The undulator magnetic field has an intensity of 0.4 T, a cyclic length of 50 cm, the number of periods of 14 and a length of 7 m. For producing such an undulator magnetic field, an undulator method by use of a permanent magnet to be used in a radiation facility or an electromagnet method are simple and easy to use. An adjustment mechanism for adjusting the distance between the opposing magnetic poles and so forth is required. It is to be understood that this undulator is easy to manufacture, since the undulator has a length of 50 cm and the distance between the magnetic poles is 2.5 times of 20 cm. If for any development in the detailed design, an undulator magnetic field of 1 T and having $L_1$=6 cm, (see JAEARI-Research 97-057) is employed, $L_\beta$ beam of Lyman series (102.53 nm and the laser beam being 511.83 nm) can be utilized, so that since the absorption sectional area is made larger by about three times (see Tsutomu Ishimura, Study on Nuclear Fusion, Vol. 32, Supplementary Vol. 2, 1974, Nagoya University, Plasma Research Institute, Gathering for Discussion about Nuclear Fusion, p.32), the necessary laser output will be ⅓ of that in the above-mentioned case.

Utilization of the relativistic Doppler effect and an optical resonator has extremely mitigated the load over the laser output. By efficiently exciting the neutral atom in the ground state to the level of n=4 by using the resonance excitation method, the load over the laser can be said to have been mitigated. However, since the absorption sectional area for resonance excitation is largely dependent on the velocity width distribution of the accelerated $H^0$ beam, the effective absorption sectional area will be made larger if the width of the velocity expansion is narrowed, and the required laser output may be decreased.

Since the beam spill by this injection method is almost zero, the rate of the non-ionization of $10^{-5}$ may be realized by use of laser oscillation capacity of the average output of 732 W. A laser of this capacity may be implemented by a YAG+Dye Laser method and is of a very excellent performance as compared to a prior art. With regard to the dye, DAMC (coumarin dielectric) is recommended in view of the oscillation wave length range. Or the possibility of selecting a second harmonic wave of Ti:sapphire which has been recently often studied may be used. Furthermore, as the other laser, application of LiYF4:$Tm^{+3}$ (453 nm) solid laser or a long pulse free electron laser of the super-conducting linear electron accelerator which is under development may also be conceived. However, in the case of the former it is necessary to reduce the energy of $H^0$ beam and in the case of the latter, it is necessary to increase the electron energy and shorten the wave length.

In summary of what has been described, an ionizer for an injection device has been devised, said ionizer has taken the best use of the features of the relativistic beam of 1.5 GeV and also utilized the Lorentz magnetic field and the relativistic Doppler effect, thus having largely mitigated the restriction for a laser such as the output of the laser (being less than 1 kW), the wave length of the visible light range (486 nm) and so forth. This device makes it possible to keep the beam spill rate at the level of $10^{-5}$ which is so small that the peripheral devices will hardly be subject to radio activation. Furthermore, use of the undulator magnetic field and photon is capable of not only making the deflection angle of the beam small but also largely reducing the adverse affect such as scattering of the circulating ion beam, being extremely promising in the aspect of low radio activation. Applicability of the resonance ionization method of a novel accelerator provided by the resonance excitation and the undulator magnetic field and, in addition, possibility of using only one wave length and one stage process in the so-called visible light range are expected to widely open the way for the efficient application of the laser in the ring-type injection of a long pulse beam in such device as a super-conducting accelerator.

While the present invention has been described in a great detail by referring to the preferred embodiment, it should be understood that the change and modification of the present invention may be executed within the spirit and scope of the present invention.

What is claimed is:

1. A charge-exchange device comprising:
    a magnetic field generation means for generating an undulator magnetic field in the direction of $H^0$ neutral beam being injected, said undulator magnetic field generating the Lorentz electric field by interaction with the relativistic velocity of said injected $H^0$ neutral beam; and
    an optical resonator for amplifying the photon density of a laser beam to the extent of the photon density wherein the laser beam collides against said injected $H^0$ neutral beam at the relativistic velocity to resonantly excite said $H^0$ to a desired principal quantum number; and wherein
        said magnetic field generation means and said optical resonator cooperate with each other to cause the laser beam of which photon density has been amplified to collide against the injected $H^0$ beam so as to resonantly excite said $H^0$ to a desired principal quantum number and excite the same by the relativistic Doppler effect to ionize the same to $H^+$ ion by said generated Lorentz electric field.

2. The charge-exchange device of claim 1 wherein siad undulator magnetic field is a cyclic magnetic field.

* * * * *

UNITED STATES PATENT AND TRADEMARK OFFICE
CERTIFICATE OF CORRECTION

PATENT NO.: 6,137,246
DATED: October 24, 2000
INVENTOR(S): Yasuo SUZUKI

It is certified that an error appears in the above-identified patent and that said Letters Patent is hereby corrected as shown below:

In [73] Assignee, after "Research" insert --Institute--.

Signed and Sealed this

Twenty-second Day of May, 2001

*Attest:*

NICHOLAS P. GODICI

*Attesting Officer*  *Acting Director of the United States Patent and Trademark Office*